(12) United States Patent
Lin et al.

(10) Patent No.: US 8,825,958 B2
(45) Date of Patent: Sep. 2, 2014

(54) HIGH-PERFORMANCE CACHE SYSTEM AND METHOD

(71) Applicant: Shanghai Xin Hao Micro Electronics Co. Ltd, Shanghai (CN)

(72) Inventors: Kenneth Chenghao Lin, Shanghai (CN); Haoqi Ren, Shanghai (CN)

(73) Assignee: Shanghai Xin Hao Micro Electronics Co. Ltd., Shanghai (CN)

( * ) Notice: Subject to any disclaimer, the term of this patent is extended or adjusted under 35 U.S.C. 154(b) by 0 days.

(21) Appl. No.: 13/962,152

(22) Filed: Aug. 8, 2013

(65) Prior Publication Data

US 2013/0339611 A1 Dec. 19, 2013

Related U.S. Application Data

(63) Continuation of application No. 13/056,974, filed as application No. PCT/CN2010/080114 on Dec. 22, 2010, now Pat. No. 8,527,707.

(30) Foreign Application Priority Data

Dec. 25, 2009 (CN) .......................... 2009 1 0247204

(51) Int. Cl.
 *G06F 12/08* (2006.01)
 *G06F 9/38* (2006.01)
(52) U.S. Cl.
 CPC .......... *G06F 12/0875* (2013.01); *G06F 9/3804* (2013.01); *G06F 9/3808* (2013.01)
 USPC ....................... 711/125; 711/E12.02; 712/233
(58) Field of Classification Search
 None
 See application file for complete search history.

(56) References Cited

U.S. PATENT DOCUMENTS

| 5,784,711 | A * | 7/1998 | Chi ............................... 711/213 |
| 6,157,988 | A * | 12/2000 | Dowling ....................... 711/140 |
| 6,647,467 | B1 * | 11/2003 | Dowling ....................... 711/140 |
| 6,681,318 | B2 * | 1/2004 | Chaudhry et al. ............ 712/207 |
| 7,197,603 | B2 * | 3/2007 | Dowling ....................... 711/140 |
| 7,398,358 | B2 * | 7/2008 | Dowling ....................... 711/140 |
| 2001/0054137 | A1 * | 12/2001 | Eickemeyer et al. .......... 712/11 |
| 2004/0068643 | A1 * | 4/2004 | Dowling ....................... 712/239 |
| 2007/0174599 | A1 * | 7/2007 | Dowling ....................... 712/239 |

\* cited by examiner

*Primary Examiner* — Kevin Verbrugge
(74) *Attorney, Agent, or Firm* — Anova Law Group, PLLC

(57) ABSTRACT

A digital system is provided for high-performance cache systems. The digital system includes a processor core and a cache control unit. The processor core is capable of being coupled to a first memory containing executable instructions and a second memory with a faster speed than the first memory. Further, the processor core is configured to execute one or more instructions of the executable instructions from the second memory. The cache control unit is configured to be couple to the first memory, the second memory, and the processor core to fill at least the one or more instructions from the first memory to the second memory before the processor core executes the one or more instructions. Further, the cache control unit is also configured to examine instructions being filled from the first memory to the second memory to extract instruction information containing at least branch information, to create a plurality of tracks based on the extracted instruction information; and to fill the at least one or more instructions based on one or more tracks from the plurality of instruction tracks.

22 Claims, 16 Drawing Sheets

HIGH-PERFORMANCE CACHE SYSTEM AND METHOD

This application is a continuation application of U.S. patent application Ser. No. 13/056,974, filed on Jan. 31, 2011, which is a U.S. national stage application of International Patent Application PCT/CN2010/080114, filed on Dec. 22, 2010, which claims priority of Chinese Patent Application No. 200910247204.4, filed on Dec. 25, 2009, the contents of all of which are incorporate herein by reference.

TECHNICAL FIELD

The present invention generally relates to integrated circuit technologies and, more particularly, to the methods and systems for high-performance computing.

BACKGROUND ART

In general, cache is used to duplicate a certain part of main memory, so that the duplicated part in the cache can be accessed by a processor core or central processing unit (CPU) core in a short amount of time and thus to ensure continued pipeline operation of the processor core.

Currently, cache addressing is based on the following ways. First, an index part of an address is used to read out a tag from a tag memory. At the same time, the index and an offset part of the address are used to read out contents from the cache. Further, the tag from the tag memory is compared with a tag part of the address. If the tag from the tag memory is the same as the tag part of the address, called a cache hit, the contents read out from the cache are valid. Otherwise, if the tag from the tag memory is not the same as the tag part of the address, called a cache miss, the contents read out from the cache are invalid. For multi-way set associative cache, the above operation is performed in parallel on each set to detect which way has a cache hit. Contents read out from the set with the cache hit are valid. If all sets experience cache misses, contents read out from any set are invalid. After a cache miss, cache control logic fills the cache with contents from lower level storage medium.

Cache miss can be divided into three types: compulsory miss, conflict miss, and capacity miss. Under existing cache structures, except a small amount of pre-fetched contents, compulsory miss is inevitable. But, the current pre-fetching operation carries a not-so-small penalty. Further, while multi-way set associative cache may help reduce conflict misses, the number of way set associative cannot exceed a certain number due to power and speed limitations (e.g., the set-associative cache structure requires that contents and tags from all cache sets addressed by the same index are read out and compared at the same time). Further, with the goal for cache memories to match the speed of the CPU core, it is difficult to increase cache capacity. Thus, multiple layers of cache are created, with a lower layer cache having a larger capacity but a slower speed than a higher layer cache.

DISCLOSURE OF INVENTION

Technical Problem

Thus, current modern cache systems normally comprise multiple layers of cache in a multi-way set associative configuration. New cache structures such as victim cache, trace cache, and pre-fetching (putting the next cache block into a cache buffer while fetching a cache block or under a pre-fetch instruction) have been used to address certain shortcomings. However, with the widening gap between the speed of the processor and the speed of the memory, the existing cache architectures, especially with the various cache miss possibilities, are still a bottleneck in increasing the performance of modern processors or computing systems.

Technical Solution

The disclosed methods and systems are, directed to solve one or more problems set forth above and other problems.

One aspect of the present disclosure includes a digital system. The digital system includes a processor core and a cache control unit. The processor core is capable of being coupled to a first memory containing executable instructions and a second memory with a faster speed than the first memory. Further, the processor core is configured to execute one or more instructions of the executable instructions from the second memory. The cache control unit is configured to be coupled to the first memory, the second memory, and the processor core to fill at least the one or more instructions from the first memory to the second memory before the processor core executes the one or more instructions. Further, the cache control unit is also configured to examine instructions being filled from the first memory to the second memory to extract instruction information containing at least branch information, to create a plurality of tracks based on the extracted instruction information; and to fill the at least one or more instructions based on one or more tracks from the plurality of instruction tracks.

Another aspect of the present disclosure includes a method for facilitating operation of a processor core coupled to a first memory containing executable instructions and a second memory faster than the first memory. The method includes examining instructions being filled from the first memory to the second memory to extract instruction information containing at least branch information, and creating a plurality of tracks based on the extracted instruction information. The method also includes filling at least one or more instructions based on one or more tracks from the plurality of instruction tracks from the first memory to the second memory before the processor core executes the at least one or more instructions from the second memory such that the processor core fetches the at least one or more instructions for execution independently from the first memory.

Another aspect of the present disclosure includes a method for use in a cache control device to control cache operation for a processor core capable of being coupled to a first memory containing executable instructions and a second memory with a faster speed than the first memory. The processor core is configured to execute one or more instructions of the executable instructions from the second memory. The method includes examining instructions being filled from the first memory to the second memory, and extracting instruction information from the examined instructions. The method also includes determining a branch point before the processor core executes the branch point, based on the extracted instruction information; and filling an instruction block corresponding to a branch target instruction of the branch point, from the first memory to the second memory such that the processor core executes any instruction resulted from the branch point from the second memory.

Another aspect of the present disclosure includes a method for use in a cache control device to control cache operation of a plurality of cache memories including a first memory and a second memory being coupled to a processor core and to the first memory. The method includes respectively examining instructions being filled into the plurality of cache memories, and extracting instruction information from the examined instructions. The method also includes creating a track point entry in a track table in which a target track point of the entry is represented by one of a low-level cache memory block number, and a high-level cache memory block number based on the extracted instruction information. When the target track point is represented by the low-level cache memory block number, an instruction block corresponding to the target track point is filled in the first memory, and when the target track point is represented by the high-level cache memory block number, the instruction block corresponding to the target track is filled in the second memory instead of the first memory.

Another aspect of the present disclosure includes a cache control device for controlling cache operation for a processor core capable of being coupled to a first memory containing executable instructions and a second memory with a faster speed than the first memory, and configured to execute one or more instructions of the executable instructions from the second memory. The cache control device includes a first fill and generator unit, a tracker, and an allocator. The fill and generator unit is configured to examine instructions being filled from the first memory to the second memory, and to extract instruction information from the examined instructions. The tracker is configured to a look-ahead pointer to determine a branch point before the processor core executes the branch point, based on the extracted instruction information. Further, the allocator is configured to fill an instruction block corresponding a branch target instruction of the branch point from the first memory to the second memory such that the processor core executes any instruction resulted from the branch point from the second memory.

Other aspects of the present disclosure can be understood by those skilled in the art in light of the description, the claims, and the drawings of the present disclosure.

Advantageous Effects

The disclosed systems and methods may provide fundamental solutions to caching structure used in digital systems. Different from the conventional cache systems using a fill after miss scheme, the disclosed systems and methods fill instruction and data caches before a processor executes an instruction or accessing a data, and may avoid or substantially hide compulsory misses. That is, the disclosed cache systems are integrated with pre-fetching process, and eliminate the need for the conventional cache tag matching processes. Further, the disclosed systems and methods essentially provide a fully associative cache structure thus avoid or substantially hide conflict misses and capacity misses. In addition, the disclosed systems and methods support simultaneous searching for a multiple layers of cache structures therefore reduce the multi-layer cache miss penalty. The disclosed systems and methods can also operate at a high clock frequency by avoiding tag matching in time critical cache accessing. The power efficiency of the disclosed system and method is also significantly better than the conventional cache system due to less matching operations required and a lower cache miss rate. Other advantages and applications are obvious to those skilled in the art.

BEST MODE

Figure 10A:
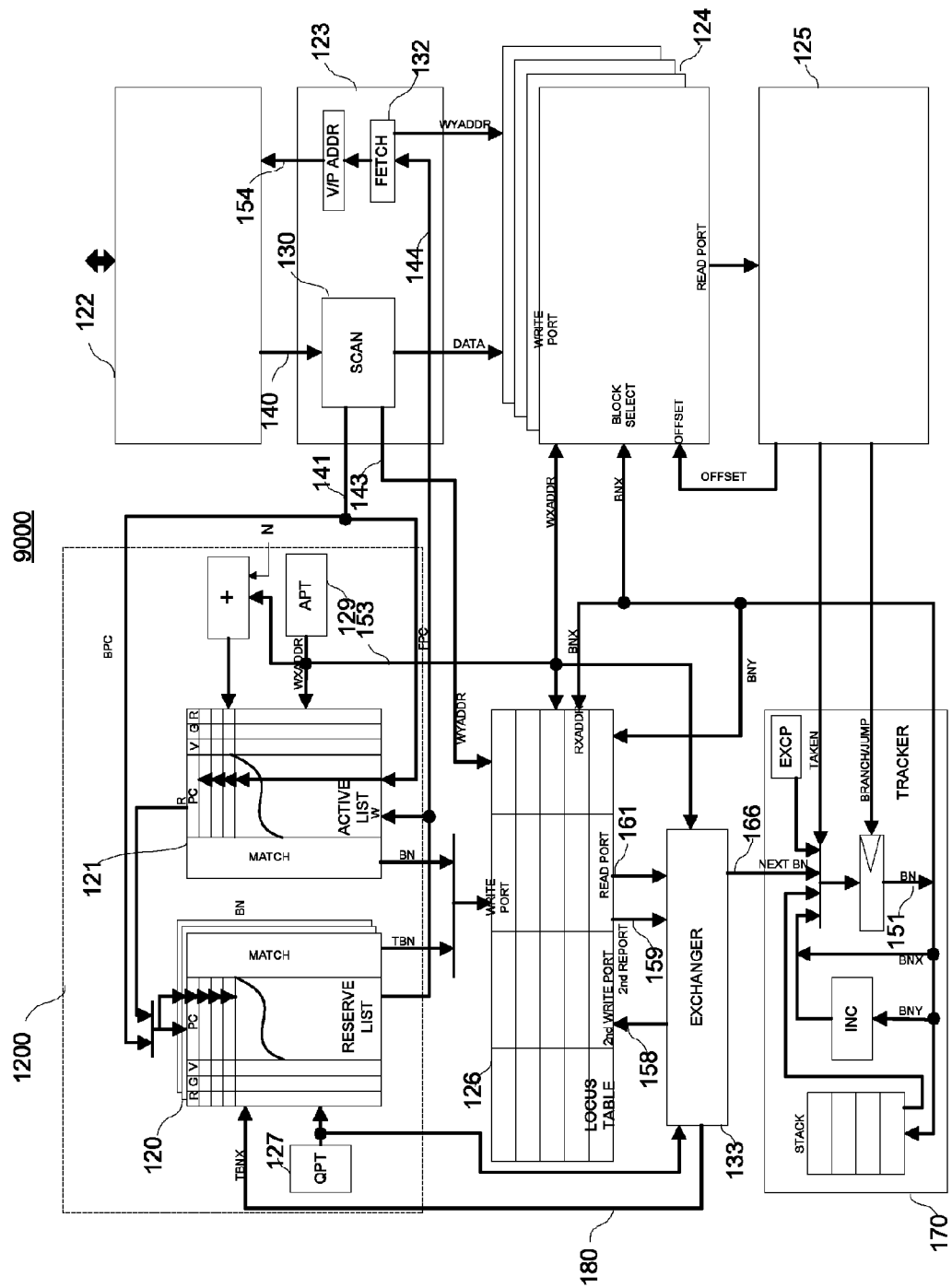
FIG. 10A illustrates another exemplary cache system consistent with the disclosed embodiments.

FIG. 10A illustrates an exemplary preferred embodiment(s).

Mode for Invention

Reference will now be made in detail to exemplary embodiments of the invention, which are illustrated in the accompanying drawings. The same reference numbers may be used throughout the drawings to refer to the same or like parts.

Figure 1:
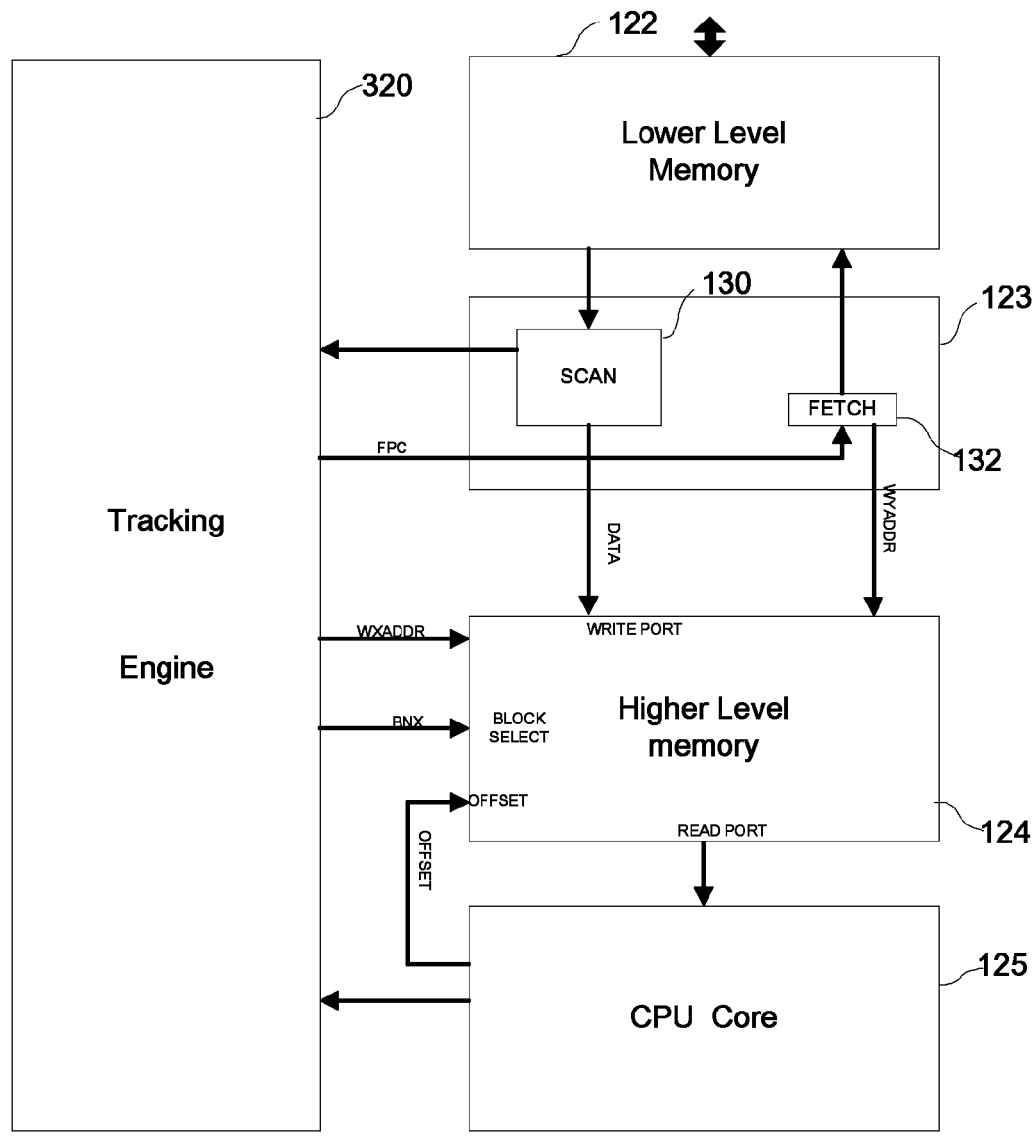
FIG. 1 illustrates an exemplary computing environment incorporating certain aspects of the present invention.

FIG. 1 shows an exemplary computing environment incorporating certain aspects of the present invention. As shown in FIG. 1, computing environment 1000 may includes a CPU core 125, a higher level memory 124, a fill/generator 123, a lower level memory 122, and a tracking engine 320. It is understood that the disclosed components or devices are for illustrative purposes and not limiting, certain components or devices may be omitted and other components or devices may be included. Further, only reading operation may be described in details with the understanding that writing operation is similar to reading operation.

Higher level memory 124 and lower level memory 122 may include any appropriate memory devices, such as SRAM, DRAM, and flash memory. As used herein, the level of a memory refers to the closeness of the memory in coupling with a processor core. The closer to the processor core, the higher the level. Further, a memory with a higher level is generally faster in speed while smaller in size than a memory with a lower level. Without limiting, higher level memory 124 may act as a cache for the system or a level one cache, if other caches exist, and may be separated into a plurality memory segments called blocks (e.g., memory blocks) for storing data (i.e., both instructions and data) to be accessed by CPU core 125.

CPU core 125 may include any appropriate processor capable of operating in a pipeline mode and with cache systems. CPU core 125 may use separate caches for instructions and data, and may also include certain instructions for cache operations. For CPU core 125 to execute an instruction, CPU core 125 first needs to read the instruction and/or data from memory. Tracking engine 320 and fill/generator 123 are configured to allow CPU core 125 to read the instruction from higher level memory 124 with significantly less cache misses by filling higher level memory 124 with instructions to be executed by CPU core 125, and such filling is also performed independently from history of execution of instructions by CPU core 125. As used herein, the term 'fill' means to move data/instruction from a lower level memory to a higher level memory, and the term 'memory access' means that CPU core 125 reads from or writes to the closest memory (i.e., higher level memory 124 or level-one cache).

Tracking engine 320 along with other components, such as fill/generator 123 may be implemented in integrated circuitry as part of a processor chip or as a separate chip, or may be implemented as programs running in a processor chip, or a combination of hardware and software.

In certain embodiments, tracking engine 320 may generate a proper address for fetching the instruction or an instruction block containing the instruction, based on information from fill/generator 123 and CPU core 125. Tracking engine 320 may also provide the proper address to fill/generator 123 such that fill/generator 123 fetches the instruction or the instruction block, using the proper address, from lower level memory 122 and stores the instruction or the instruction block in higher level memory 124. Further, tracking engine 320 may also generate a block number for higher level memory 124. The block number and an address offset provided by CPU core 125 may then be used to address higher level memory 124 by the CPU core 125 to read the instruction without a cache miss.

More particularly, fill/generator 123 includes a generator 130 and a fill engine 132. Fill engine 132 may fetch the instruction or the instruction block with the proper address. Generator 130 may examine every instruction fetched from lower level memory 122 and extract certain information of the instruction, such as instruction type, instruction address, and branch target information of a branch instruction. The instruction and extracted information including branch target information is provided to tracking engine 320. A branch instruction or a branch point, as used herein, refers to any appropriate type of instruction which may cause the CPU core 125 to change an execution flow executing an instruction out of sequence).

Based on the instruction and branch target information, tracking engine 320 may determine addressing information such as instruction type, branch source address, and branch target address information. For example, an instruction type may include conditional branch instruction, unconditional branch instruction, and other instructions, etc. Under certain circumstances, unconditional branch may be a special case of conditional branch instruction, with the condition forced to true. The instruction type may thus include branch instruction and other instructions, etc. A branch source address may refer to the address of the branch instruction itself, and a branch target address may refer to the address being branched to if the branch is taken. Other information may also be included.

Figure 2A:
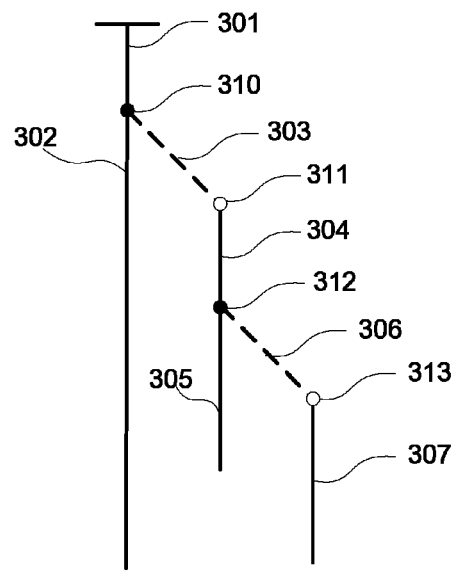
FIG. 2A illustrates an exemplary address tree consistent with the disclosed embodiments.

Further, tracking engine 320 may build an address tree or a track table based on the determined information to provide addressing information to be used to fill higher level memory 124. FIG. 2A shows an exemplary address tree 300 consistent with the disclosed embodiments.

As shown in FIG. 2A, address tree 300 may include tree nodes 310 and 312, tree trunk 301, 302, 304, 305 and 307, and tree branch 303 and 306. A tree trunk refers to a sequence of instructions with a fixed or variable length. A tree node may refer to a branch instruction where a branching may take place right after the branch instruction. If the branch does take place, a tree branch is formed between the tree node and the branch target address. For example, 301, 302, 304, 305, and 307 are normal instructions in sequence and form respective tree trunks; 310 and 312 are branch instructions when branching may take place and form respective tree nodes; and 311 and 313 are branch targets that form tree branches 303 and 306. Other structures, however, may also be used.

In operation, address tree 300 or any part of address tree 300 may be used as a locus or a track for an instruction sequence to be executed by CPU core 125. The first instruction of the instruction sequence is considered as the head of locus (HOL) or track head, and the instruction block containing this first instruction is fetched into higher level memory 124 to be used by CPU core 125. During execution, the current instruction may become the first instruction of the instruction sequence in execution, and thus the HOL moves along the locus. Also, one or more predicted HOL or PHOL may be generated to point to an instruction sequence that might be used by CPU core 125. For example, at a tree node (i.e., a branch instruction), two PHOLs may exist depending on whether a branch is taken. During execution, the PHOL may also moves based on branch points in the locus and normally ahead of HOL.

Address tree 300 may support different depths based on levels of branch nodes. For example, a one level address tree may only support one level of branch (e.g., a next branch); a two level address tree may support two levels of branches (e.g., a branch after the level one branch if the level one branch is not taken, or a branch after the level one branch on the branch target track if the level one branch is taken); and a multiple-level address tree may support multiple branch levels.

Figure 2B:
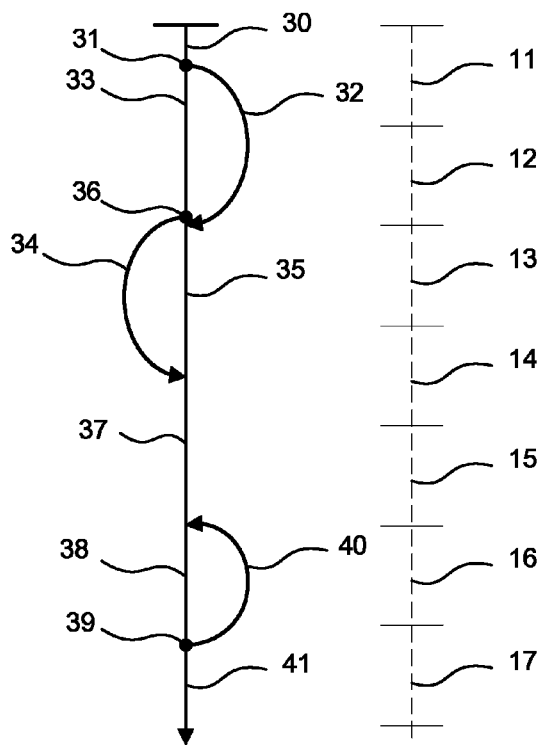
FIG. 2B illustrates an exemplary operation associated with an address tree consistent with the disclosed embodiments.

FIG. 2B shows an exemplary operation associated with an address tree consistent with the disclosed embodiments. As shown in FIG. 2B, solid lines represent program flows, curved lines represent branches, black dots represent branch instructions, and dotted lines represent actual instructions divided into various segments with a same or similar length (e.g., instruction blocks).

At the beginning, CPU core 125 executes program segment 30, until reaching a conditional branch instruction 31. If the condition of conditional branch instruction 31 is not satisfied, CPU core 125 executes program segment 33, until reaching an unconditional branch instruction 36, after which the program flow changes unconditionally to program segment 37 via branch 34. On the other hand, if the condition of conditional branch instruction 31 is satisfied, CPU core 125 executes program segment 35 via branch 32, and then continues executing program segment 37.

After executing program 37, CPU core 125 executes program segment 38 until reaching a conditional loop instruction

39. If the condition for conditional loop instruction 39 is satisfied, the program flow changes back to program segment 38 via branch 40, and again reaches conditional loop instruction 39. This loop repeats until the condition for conditional loop instruction 39 is no longer satisfied, after which CPU core 125 executes program segment 41.

The program instructions of the various program segments may be represented by instruction blocks 11, 12, 13, 14, 15, 16, and 17, and each instruction block may include a same number of instructions or different numbers of instructions, such as in a variable-length instruction set. For example, instruction block 11 may include instructions from program segment 30 and a part of program segment 33; instruction block 12 may include instructions from the other part of program segment 33; instruction block 13 may include instructions from a part of program segment 35; instruction block 14 may include instructions from the other part of program segment 35 and a part of program segment 37; instruction block 15 may include instructions from the other part of program segment 37; instruction block 16 may include instructions from a part of program segment 38; and instruction block 17 may include instructions from the other part of program 38 and a part of program segment 41. The size of each instruction block may be determined based on applications or available hardware resources and/or architectures.

For illustrative purposes, assuming each instruction block is filled into higher level memory 124 in sequence, i.e., a second instruction block is filled in higher level memory 124 after a first instruction block is filled, instead of being filled alternatively. Also, assuming the address tree 300 has a depth of one level. That is, only one level of branch is used to fill instruction blocks into higher level memory 124. Other configurations can be similarly used.

At beginning of the operation of CPU core 125, fill/generator 123 starts filling instruction block 11 into higher level memory 124, and scans each instruction being filled into higher level memory 124. In certain embodiments, two or more instructions may be scanned while one instruction is being executed, and thus scanned instructions may be in advance of executed instructions. For example, two instructions may be examined in one clock cycle while one instruction may be executed by CPU core 125 in one clock cycle, or eight instructions may be examined in one clock cycle while four instructions may be executed by CPU core 12.5 in one clock cycle, such as in a multiple-issue processor. Other configurations may also be used to scan instructions in advance of execution.

Further, after fill/generator 123 scans conditional branch instruction 31, fill/generator 123 may determine conditional branch instruction 31 is a branch instruction, and may extract a target address of the branch instruction 31, which is within program segment 35. Thus, tracking engine 320 controls fill/generator 123 to fill the instruction block corresponding to the target address, i.e., instruction block 13, into higher level memory 124.

That is, instruction block 13 is filled into higher level memory 124 in advance of execution of conditional branch instruction 31. Further, because the instruction following after conditional branch instruction 31 (in case the condition is not satisfied) is in instruction block 11 which is already filled into higher level memory 1124, no further filling operation is needed.

Further, when conditional branch instruction 31 is executed, assuming the condition is not satisfied, instructions from instruction block 11 are executed. When the last instruction of instruction block 11 is being executed, the next instruction block 12 is filled into higher level memory 124 such that the next instruction following the last instruction from instruction block 11 can be executed without any cache miss.

While filling instruction block 12, each filled instruction is scanned. Fill/generator 123 may determine that the last instruction of instruction block 12 is an unconditional branch instruction (i.e., unconditional branch instruction 36). Thus, the instruction block corresponding to the target address of unconditional branch instruction 36 instruction block 14) is filled into higher level memory 124.

Similarly, before the last instruction of instruction block 13 is completed in execution, tracking engine 320 knows the next instruction is in instruction block 14. Since instruction block 14 has been filled already, no filling is needed. Similarly, instruction blocks 15, 16, and 17 are filled into higher level memory 124 before any instructions from instruction blocks 15, 16, and 17 are executed by CPU core 125.

Further, when scanning conditional loop instruction 39 in instruction block 17, because both the target instruction block (i.e., instruction block 16) and the instruction block corresponding to the next instruction of conditional loop instruction 39 are already filled into higher level memory 124, no filling operation is needed. When the loop condition of instruction 39 is no longer satisfied, the loop ends and instructions in instruction block 17 are executed in sequence.

Figure 3A:
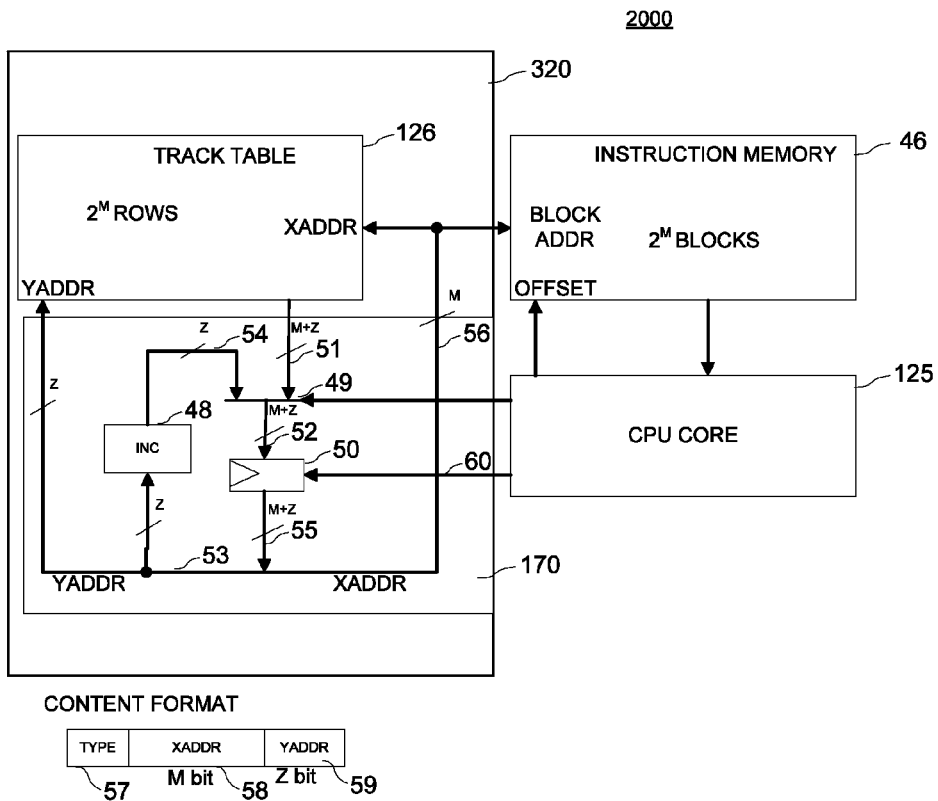
FIG. 3A illustrates an exemplary cache system consistent with the disclosed embodiments.

Therefore, tracking engine 320 and other components may conduct the above operation based on the concept of address tree to substantially reduce cache miss rate. Tracking engine 320 and other components (e.g., fill/generator 123) may also be referred to as a cache control unit interfacing with various components to substantially reduce the cache miss rate. FIG. 3A shows an exemplary cache system 2000 consistent with the disclosed embodiments.

As shown in FIG. 3A, tracking engine 320 may include a track table 126 and a tracker 170. Track table may contain tracks of instructions for execution by CPU core 125, and tracker 170 may provide various addresses based on track table 126. As used herein, a track refers to a representation of a series of instructions (e.g., an instruction block) to be executed. The representation may include any appropriate type of data, such as addresses, block numbers, or other numbers. Further, a new track may be created when a track includes a branch point with a branch target which changes program flow or with an instruction from a different instruction block, such as an instruction from a next instruction block, an exception program, and a different program thread, etc. The series of instructions may include a same number of instructions or different number of instruction, such as in a variable-length instruction set.

Track table 126 may include a plurality of tracks, and each track in rack table 126 corresponds to a row in track table 126 with a row number or a block number, which may index the corresponding memory block. A track may include a plurality of track points, and a track point may correspond to a single instruction. Further, as a track corresponds to a single row in track table 126, a track point corresponds to a single entry (e.g., a storage unit) from the row in track table 126. The total track points in a track thus may equal to the total number of entries in one row of track table 126. Other configurations may also be used.

A track point (i.e., a single entry in the table entry) may include information about a branch instruction whose branch target may be on a separate track. Thus, content of a track point may include information about a type of the corresponding instruction and a target branch address, which may include a track number which addresses a target track, and an offset which addresses an entry within the target track. By checking the contents of a track point, a target track may be determined based on the track number and a particular entry within the target track may be determined by the offset. Thus, a track table is a table (or a list) in which an address of a branch track entry corresponds to a branch source address; and the entry content corresponds to a branch target address.

For example, as shown in FIG. 3A, CPU core 125 may use a (M+Z) bit instruction address to read instructions for operation, where M and Z are integers. The M-bit part of the address may be referred as an upper address, and the Z-bit part of the address may be referred as an offset address. Track table 126 may then include $2^M$ rows, with a total $2^M$ tracks, and the upper address of M bits may be used as an index to address a track in the track table 126. Each row may include $2^Z$ tracks entries, with a total $2^Z$ track points, and the offset address (Z bits) may be used as an offset to address the corresponding row to determine a particular track point (entry).

When a new track is to be created, the new track may be placed at an available row of track table 126. If the new track includes a branch track point (corresponding to a branch source instruction) then a branch track point may be created at an entry of the row. The positions of the row and entry of the branch point in track table 126 are determined by the branch source address. For example, the row may be determined based on the upper address of the branch source address, and the entry may be determined based on the offset of the branch source address.

Further, each entry or track point in the row may have a content format including a type field 57, an XADDR field 58, and a YADDR field 59. Other fields may also be included. Type field 57 may indicate the type of instruction corresponding to the track point. As previously explained, an instruction type may include conditional branch instruction, unconditional branch instruction, and other instructions. XADDR field 58 may include M bit address also called a first-dimension address or simply a first address. YADDR field 59 may include Z bit address also called a second-dimension address or simply a second address.

Further, the content of the new track point may correspond to the branch target instruction. In other words, the content of the branch track point stores the branch target address information. For example, the row number or block number of a particular row in track table 126 corresponding to the branch target instruction is stored as the first address 58 in the branch track point. Further, the offset address of the branch target within its own track is then stored as the second address 59 in the branch track point. This offset address can be calculated based on the branch source instruction address and the branch offset (distance). That is, the first address XADDR 58 stored in the branch track point (the branch source) is used as a row address and the second address YADDR 59 stored in the branch track point is used as a column address to address the branch target.

Instruction memory 46 may be a part of higher level memory 124 used for instruction access and may include any appropriate high performance memory. Instruction memory 46 may include $2^M$ memory blocks, and each memory block may include $2^Z$ bytes or words of storage. That is, instruction memory 46 may store all instructions addressed by M and Z (i.e., the instruction address) such that M bits can be used to address a particular memory block while Z bits can be used to address a particular byte or word within the particular memory block.

Tracker 170 may include various components or devices, such as registers, selectors, stacks and/or other storages, to determine a next track to be executed by CPU core 125. Tracker 170 may determine the next track based on the current track, track point information from track table 126, and/or whether a branch is taken by CPU core 125, etc.

For example, during operation, bus 55 carries the instruction address with (M+Z) bits, M bits are put onto bus 56 to track table 126 as the first address or XADDR (or X address), and Z bits are put onto bus 53 to track table 126 as the second address or YADDR (or Y address). Based on the first address and the second address, an entry in track table is identified and its content is outputted to bus 51. If the entry is corresponding to a branch instruction (a branch track point, or branch source), the entry content outputted through 51 may provide the target address of the branch.

If the condition of the branch instruction is not satisfied, the branch is not taken, and the not-taken information from the CPU core 125 will control selector 49 to select input 54, which is the YADDR on bus 53 increased by one (1) byte or word by incrementer 48, as the new second address, and may output the new address on bus 52. Register 50 keeps the first address unchanged while the second address is kept on being incremented by incrementer 48 by one (1) until a next branch instruction in the current track table row is reached. The first address and the second address are then kept in register 50 and are also provided onto bus 55.

On the other hand, if the condition of the branch instruction is satisfied, the branch is taken, and the taken information from CPU core 125 may control the selector 49 to select the new target address stored in the content of the track entry of the branch point and provided on bus 51 as the output on bus 52. Register 50 keeps the changed first address, and the new address (M+Z) is also provided onto bus 55. Control signal to selector 49 from CPU core 125 is also called a "taken" signal, indicating whether a branch is taken, to control selector 49.

Thus, for instruction memory 46 addressing purposes, a block address 56 is provided by tracking engine 320 while CPU core 125 only supplies an offset. CPU core 125 feeds back branch instruction execution status (the "taken" signal) to enable tracker 170 to make operation decisions.

Before a new track is executed, the instruction block corresponding to the track is filled into instruction memory 46. This process is repeated such that all instructions can be executed by CPU core 125 without a cache miss. Further, two second level pointers (PHOL) can be used to look beyond the first branch to exam two subsequent branch points after the first branch point, and tracker 170 and/or fill/generator 123 may perform the filling of instruction memory or cache 46 corresponding to the two target tracks of the two branch points, and thus further hide the cache-fill latency.

Figure 3B:
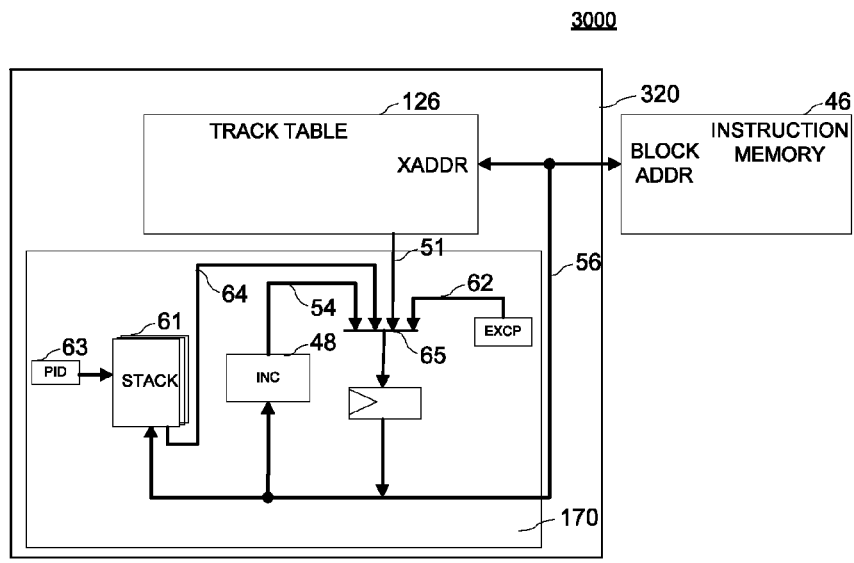
FIG. 3B illustrates another exemplary cache system consistent with the disclosed embodiments.

FIG. 3B shows another implementation 3000 consistent with the disclosed embodiments. Descriptions of similar components to those of FIG. 3A are omitted. As shown in FIG. 3B, an XADDR address or block address on bus 56 to address track table 126 and instruction memory 46 may come from various different sources. That is, tracker 170 may choose a track from a plurality of addressing sources. For example, a multiplexer 65 replaces selector 49 in FIG. 3A to select from four different sources: a target address of a current branch instruction from bus 51 (track table content); a normal address with unchanged first address and second address increased by one (1) from bus 54; an address from stack 61 on bus 64; and a track position corresponding to an exception hander EXCP from bus 62.

Multiplexer 65 may select, a track (a current, track or a new track) based on the current instruction and operation status. For example, if the second address in the new track is not a branch instruction, the first address is kept unchanged and incrementer 48 keeps increasing the second address by one (1) until reaching the next branch instruction. If the second address is or reaches a branch instruction, and the branch condition is not satisfied, the first address is also kept unchanged while the second address is increased similarly to reach the next branch instruction. On the other hand, if the branch condition is satisfied, or the branch is unconditional, the target address is used as the new first address to start a new track. Finally, if a last instruction is reached, a new track corresponding to the next instruction block is also started.

Special programs, such as exception handler, may also be filled into higher level memory 124 and corresponding tracks are created. Track point addresses of entries of the special programs may be stored in special registers (e.g., EXCP). When an event happens (e.g., an exception happens), the track point address 62, corresponding to a particular special program (e.g., an exception handler) can be selected by selector 65 to invoke the particular special program.

Further, stack 61 may include a plurality of stacks. Each stack may support stack operations such as push and pop instructions to save thread context or to save "CALL" routine states. When a program calls a routine (CALL), the address and/or other information of the track point corresponding to return address may be pushed into a stack, and when the called routine returns, the saved track point address and/or other information is popped out of the stack and force a change of track based on the track point (selector 65 selects 64). In certain embodiments, CPU core 125 may execute a "Jump and Link" type of instructions (i.e., a branch or call routine returns to a return address when the routine is completed). Similarly, a stack may be used to save the return address for this type of instruction. Further, CPU core 125 may execute a plurality of nested "CALL" or "Jump and Link" types of instructions. The stack may thus include a plurality of levels to save multiple return addresses at different stack levels. In addition, the plurality of stacks can support multi-thread programming. Track table 126 may include a plurality of tracks corresponding to different threads, and a thread identifier 63 may be used to indicate a current program thread. Further, thread identifier 63 points to a current stack to support the current thread. Other sources or arrangement may also be used.

That is, multi-thread programming can be supported by using a plurality of stacks, each one can be used separately by a thread or program identified by thread identifier 63.

Figure 4:
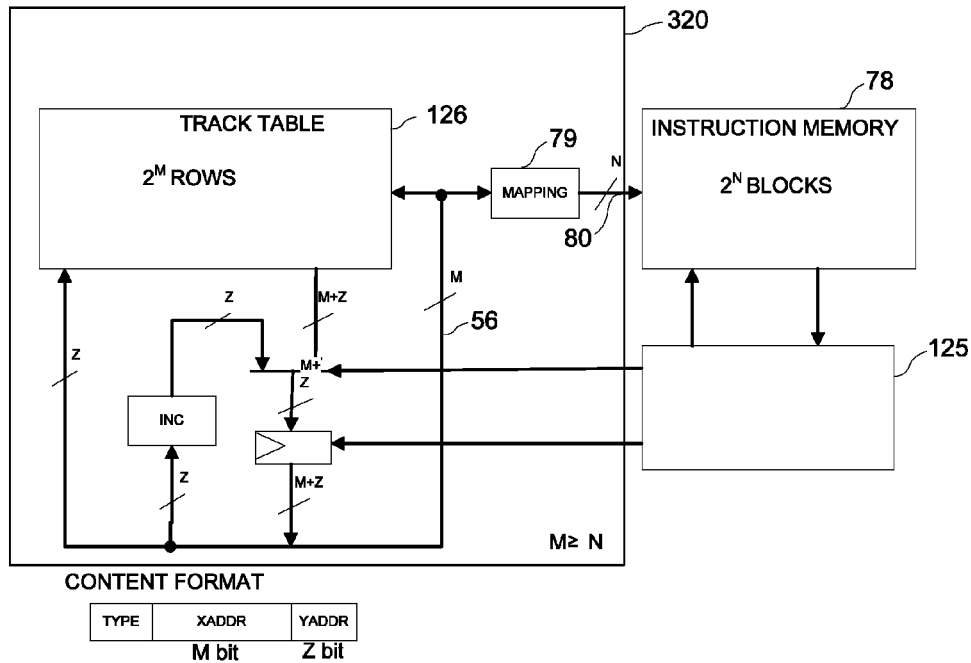
FIG. 4 illustrates another exemplary cache system consistent with the disclosed embodiments.

FIG. 4 shows another implementation 4000 consistent with the disclosed embodiments. Implementation 4000 is similar to implementation 2000 described in FIG. 3A. However, an instruction memory 78 is used instead of instruction memory 46. As shown in FIG. 4, instruction memory 78 may include $2^N$ memory blocks, where N is an integer and N≤M. That is, instruction memory 78 may contain less memory blocks than original instruction memory 46. The first address on bus 56 is thus only used to address track table 126.

Further, a mapping unit 79 may be provided to map the first address into a block number or block address 80 with N bits in length. That is, the address to the higher level memory is mapped to reduce the size of the higher level memory. Because it is less likely for CPU core 125 to use instruction addresses in the entire address space, the mapping based method can reduce the memory size of instruction memory 78 without having to provide memory blocks for all addressable addresses.

Figure 5:
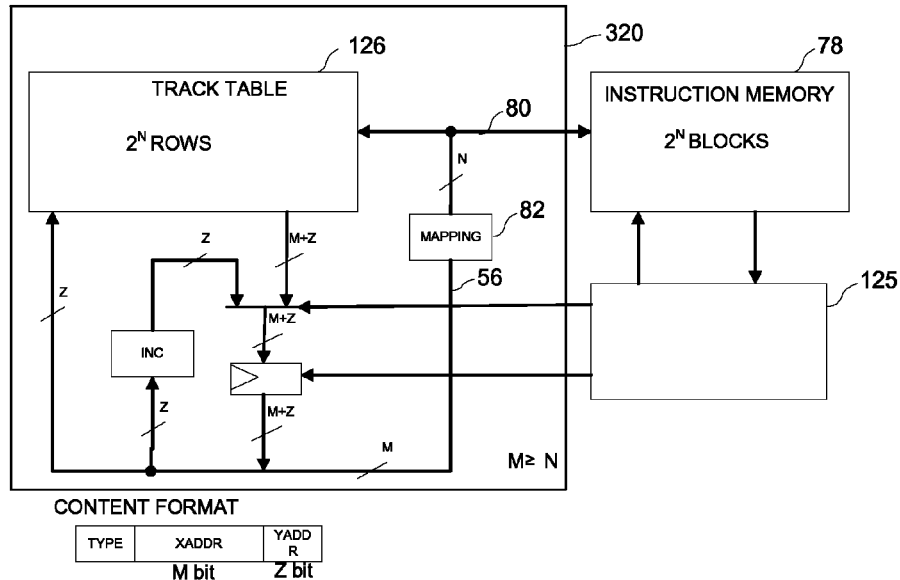
FIG. 5 illustrates another exemplary cache system consistent with the disclosed embodiments.

FIG. 5 shows another implementation 5000 consistent with the disclosed embodiments. Implementation 5000 is similar to implementation 4000 described in FIG. 4. However, track table 126 may only include $2^N$ rows. That is, the first address on bus 56 is mapped by mapping unit 82 to provide addresses for both track table 126 and instruction memory 78 to reduce the size requirement.

Further, rows in track table 126 may still use M bits for the first address and Z bits for the second address, while total numbers of rows in both track table 126 and instruction memory 78 may be less than the total addressable space addressed by CPU core 125 to reduce memory size for both track table 126 and instruction memory 78.

Figure 6:
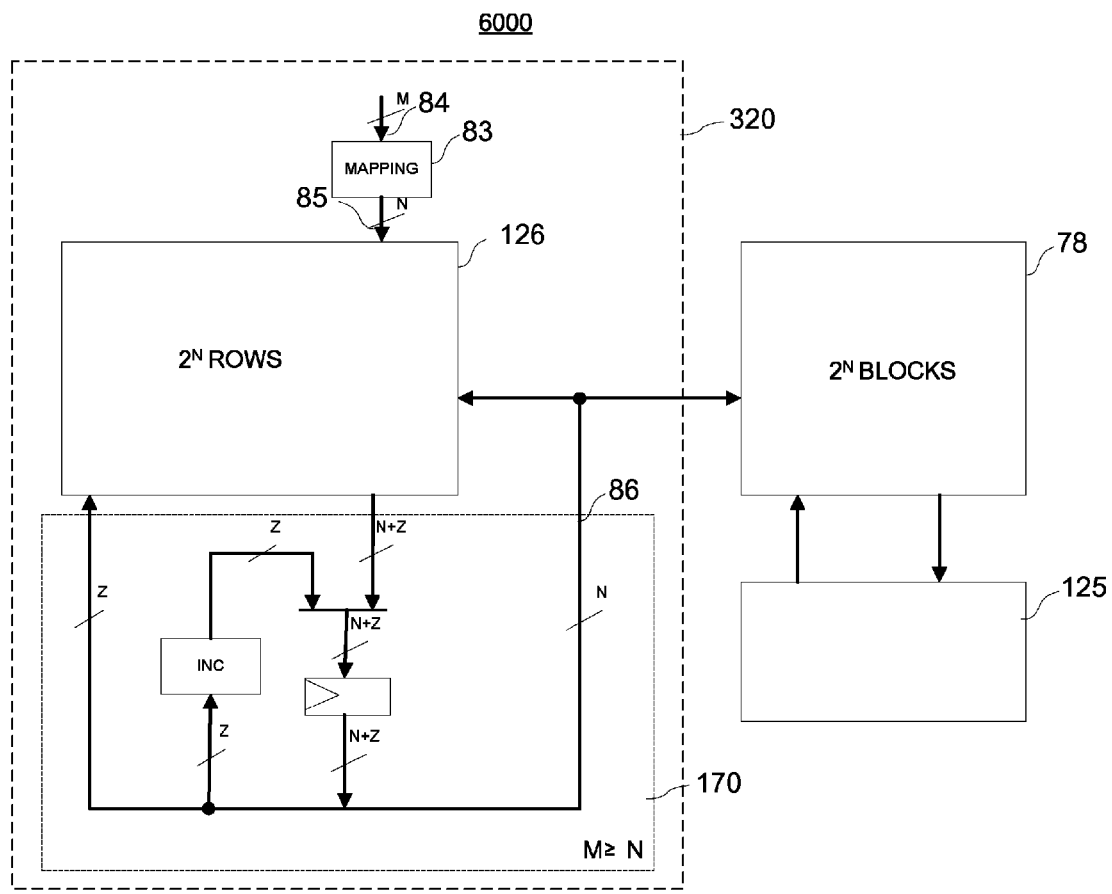
FIG. 6 illustrates another exemplary cache system consistent with the disclosed embodiments.

FIG. 6 shows another implementation 6000 consistent with the disclosed embodiments. Implementation 6000 is similar to implementation 5000 described in FIG. 5. However, as shown in FIG. 6, a mapping unit 83 may be arranged at the outside of both track table 126 and instruction memory 78 such that M-bit first address 84 is mapped into N-bit first address 85 before the first address is used by track table 126 and instruction memory 78. That is, the address to track table 126, instruction memory 78, and tracker 170 are all mapped to reduce the size.

Thus, rows in track table 126 may use N bits for the first address and Z bits for the second address, and total numbers of rows in both track table 126 and instruction memory 78 may be less than the total addressable space used by CPU core 125 to reduce memory size for both track table 126 and instruction memory 78. Further, a shorter first address may also increase performance of the entire system.

Figure 7A:
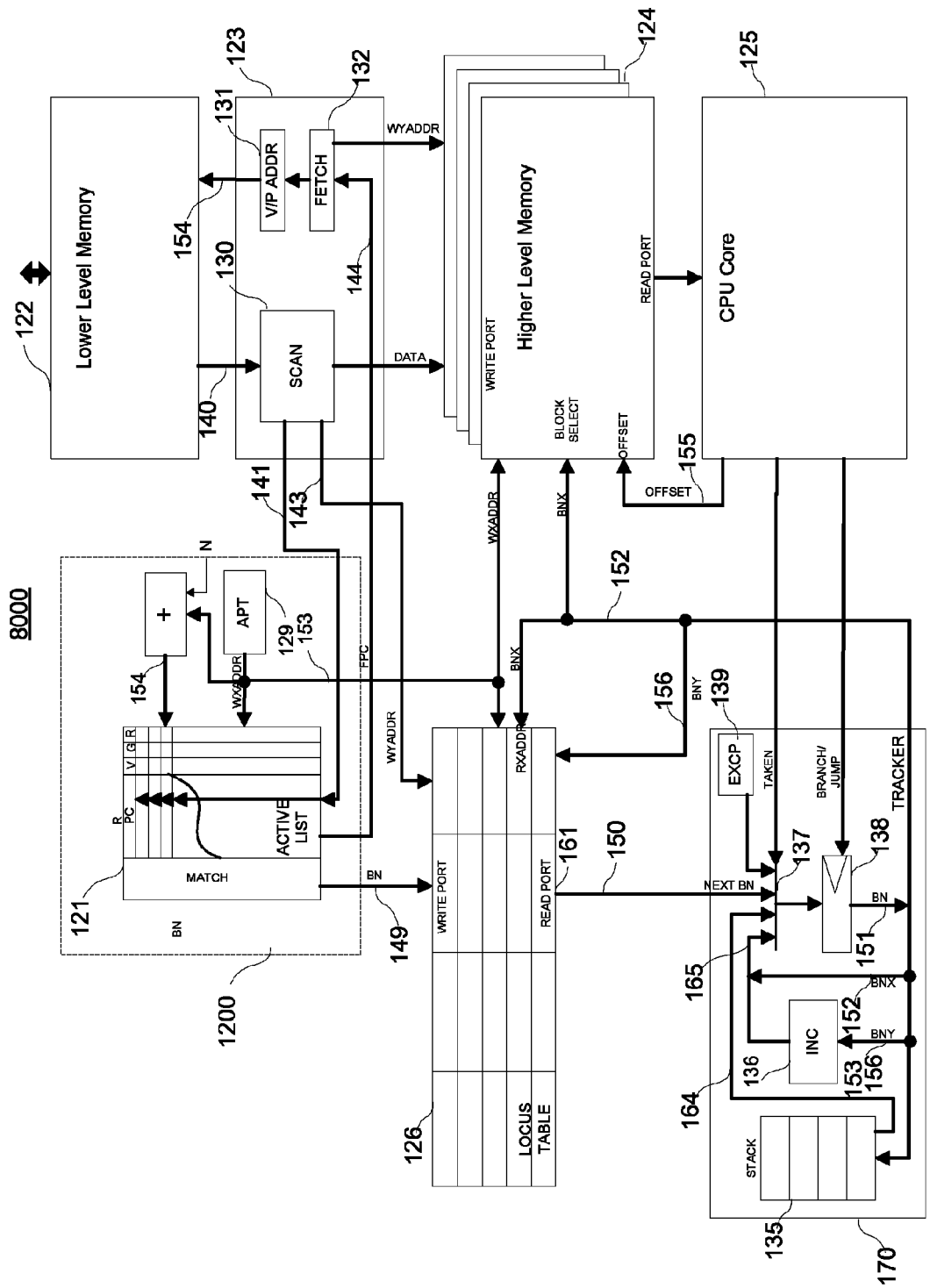
FIG. 7A illustrates another exemplary cache system consistent with the disclosed embodiments.

Although the above mapping methods may reduce the size of cache and track table, each instruction block may still correspond to a track. Additional structures may be used to keep established track from track table 126 without discarding the established track information. FIG. 7A shows an exemplary detailed implementation of cache system 8000 consistent with and/or improved upon one or more principles from above mapping methods.

As shown in FIG. 7A, cache system 8000 includes a lower level memory 122, a higher level memory 124, and a CPU core 125. Further, cache system 8000 includes a fill/generator 123, an allocator 1200, a track table 1126, and a tracker 170. Allocator 1200, track table 126, and tracker 170 may be major part of tracking engine 320 (not shown). Also, as explained previously, tracking engine 320, fill/generator 123, and other related logics may be referred to as a cache control unit. It is understood that the various components are listed for illustrative purposes, other components may be included and certain components may be combined or omitted. The various components may be distributed over multiple systems, may be physical or virtual, and may be implemented in hardware (e.g., integrated circuitry), software, or a combination of hardware and software.

Further, fill/generator 123 may include a fill engine 132, a generator 130, and address translation unit 131, and tracker 170 may include a multiplexer 137, register 138, incrementer 136, and stack 135. Other components may also be included and certain components may be omitted. For illustrative purposes only, higher level memory 1124 may be treated as a level-one (L1) cache, and lower level memory 122 may be treated as a level-two (L2) cache or a main memory, depending on particular applications and configurations. As explained previously, generator 130 extracts branch instruction (source) address (corresponding to the track table address for the branch instruction), branch type, and branch target address (corresponding to the track table content of the branch track point) to create track table 126.

Allocator 1200 may be used to store or allocate storage for track information to reduce size requirements of track table 126 and higher level memory 124. For example, allocator 1200 may include an active list 121. An active list may store information of an established track, and create a mapping between an address (or a part of the address) and a block number such that tracks can use any available rows in track table 126. For example, when creating a track, address information of the track is stored in the active list. Other arrangement may also be used.

Figure 8:
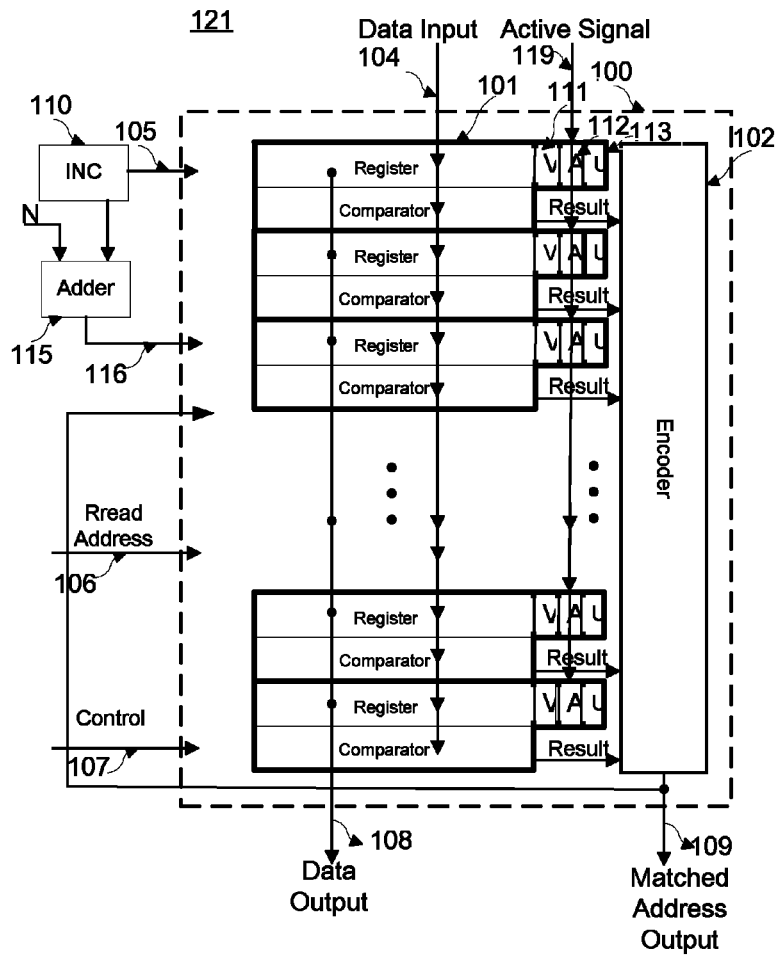
FIG. 8 illustrates an exemplary active list consistent with the disclosed embodiments.

As shown in FIG. 7A, active list 121 may be used to store the block addresses of the instruction blocks in higher level memory 124, each valid block address corresponding to a block number (BNX). The block number of a particular address may be obtained by a content matching between the address and the entries of active list 121. The matched content encodes a block number, which may then be used to index a row in the track table and a block in higher level memory 124. If there is no match, it means that a track corresponding to the address has not been established. The instruction block corresponding to the address is filled into higher level memory 124, a new track is created in track table 126 at a row indexed by address pointer 1129 through bus 153, and the active list 121 entry indexed by pointer 129 through bus 153 is updated (written) with the associated block address. FIG. 8 shows an exemplary active list consistent with the disclosed embodiments.

As shown in FIG. 8, active list 121 may include a data/address bidirectional addressing unit 100. In one direction, data/address bidirectional addressing unit 100 may output a BNX number based on a block address input. Data/address bidirectional addressing unit 100 produces a corresponding BNX number by matching the inputted block (upper) address with the contents in data/address bidirectional addressing unit 100. In the other direction, data/address bidirectional addressing unit 100 may output a corresponding block address with a BNX number input. The inputted BNX number may index the entry in which the block address is stored. Further, data/address bidirectional addressing unit 100 may include a plurality of entries 101, each entry 101 includes a register, a comparator, a flag bit 111 (i.e., V bit), a flag bit 112 (i.e., A bit), and a flag bit 113 (i.e., U bit). Result from the comparator may be provided to encoder 102 to generate a matching entry number.

Control 107 may be used to control read/write state. V (valid) bit of each entry 101 may be initiated as '0', and A (Active) bit for each entry 101 may be written by an active signal on input line 119. A write pointer 105 may point to an entry in data/address bidirectional addressing unit 100, and the pointer is generated by a wrap-around increment unit 110 (129 in FIG. 7A). The maximum number generated by wrap-around increment unit 110 is the same as a total number of entries 101. After reaching the maximum number, the next number is generated from wrap-around increment unit 110 by increasing one to start from '0', and continues the increment until reaching the maximum number again.

During operation, when write pointer 105 points to a current entry 101, V bit and A hit of the current entry 101 may be checked. If both V hit and A bit are '0', the current entry is available for writing. After the write operation is completed, wrap-around increment unit 110 may increase the pointer by one (1) to point to next entry. However, if either of V bit and A bit is not '0', the current entry is not available for writing, wrap-around increment unit 110 may increase the pointer by one (1) to point to next entry, and the next entry is checked for availability for writing.

During matching, inputted block address data input 104 is compared with the content of the register of each entry 101. The contents in the registers may only contain the upper part of the address (corresponding to a memory block in memory 124). If there is a match, the encoder 102 encodes the matching result into an entry number and provides the entry number onto match address output 109. If there is no match, the inputted block address is written into the register 101 of the entry pointed by address pointer 105, the V bit of the same entry is also set to '1', and the entry number is provided onto match address output 109. This entry number outputted is later referred as BNX (i.e., block number because it index a memory block). The lower part of the input address (i.e., the offset within a memory block) is later referred as BNY. The BNX and BNY together are referred as BN which is later stored in a track table entry and is used to index track table 126, higher level memory 124, and active list 121. Although generally standing for 'block number', the term 'BN', as used herein, may refer to the entire address and thus includes both BNX and BNY, or may refer to only an upper part of the address and thus is equivalent to BNX, depending on a particular usage context as understood by those skilled in the art. Further, wrap-around increment unit 110 may increase the pointer BNY by one (1) to point to next entry.

For reading, read address 106 is provided to select an entry in entries 101, and the content of the register of the selected entry will be read out and provided onto data output 108, and the V bit of the selected entry 101 is set to '1'.

U bit of an entry 101 may be used to indicate usage status. When write pointer 105 points to an entry 101, the U bit of the pointed entry is set to '0'. When an entry 101 is read, the U bit of the read entry is set to '1'. Further, when wrap-around increment unit 110 generates a write pointer 105 pointing to a new entry, the U bit of the new entry is checked. If the U bit is '0', the new entry is available for replacement, and write pointer 105 stays on the new entry far possible data to be written. However, if the U bit is '1', write pointer 105 further points to a next entry.

Optionally, a window pointer 116 may be used to set a U bit of a pointed entry to '0', and window pointer 116 is N entries ahead of write pointer 105 (N is an integer). The value of window pointer 116 may be determined by adding value N to the write pointer 105 by adder 115. The N entries between write pointer 105 and window pointer 116 are considered as a window. Thus, clear pointer sets the U bit of an entry to "0". Later, any read of the entry sets the U bit to "1". When the write pointer 105 points to the entry, the U bit is checked. If the U bit is "0", which means this entry has not been used since the clear pointer 116 clears this entry, so the write pointer 105 stays at this entry to index this entry for the next writing. On the other hand if the U bit is a "1", which indicates this entry has been used recently, then the write pointer moves on to next entry. The replacing rate of the entries in 101 can be changed by changing the size of window (i.e., changing the value of N). This thus may be used as a usage-based replacement policy for replacing entries in active list 121.

Alternatively, the U bit may include more than one bits thus becomes the U bits. The U bits may be cleared by write pointer 105 or window (clear) pointer 116, and every read may increase the U bits by '1'. During writing operation, the U bits of a current entry are compared to a predetermined number. If the value of U bits is less than the predetermined value, the current entry is available to be replaced. If the value of U bits is greater than the predetermined value, write pointer 105 moves to next entry.

Returning to FIG. 7A, when CPU core 125 starts up, a reset, signal (not shown) sets '0' to the valid bit of all entries of active list 121. When reset signal is released, a reset vector (reset startup instruction address) is placed on bus 141 to active list 121 for matching. Because there is no matching with the contents of the entries, active list 121 writes the upper part of the address (i.e. the reset vector) into the active list entry pointed by WXADDR 153 generated by pointer 129, sets the valid bit to '1' for the entry, and puts the reset vector on bus 144 to fill engine 132.

Fill engine 132 fetches the instructions addressed by reset vector from lower level memory 122 through bus 154. The fetched instructions are filled into higher level memory 124 to a memory block indexed by WXADDR 153 from pointer 129. Also, when the instructions are fetched from lower level memory 122 through bus 140, generator 130 may scan and analyze the instructions. Further, track information associated with the instruction is written to corresponding entries or track points in the row in track table 126 pointed by WXADDR 153.

After this filling operation is completed, pointer 129 moves to a next available entry in active list 121. Optionally, address translation unit 131 may translate between virtual memory address and physical memory address. Address translation unit 131 may also be placed outside lower level memory 122 to reduce fetching delays from lower level memory 122 to higher level memory 124.

Generator 130 scans every instruction in an instruction block filled into higher level memory 124. When generator 130 finds a branch instruction, it calculates a target address of the branch instruction. The target address may be represented by the address of the instruction block containing the branch instruction plus an offset of the branch instruction, and also plus a branch distance to the target instruction. The lower part of the target address is the branch target instruction's offset within the row (later referred as BNY). The upper part of the calculated target address is then matched with contents active list 121. If there is no match, active list 121 may put this value on bus 144 to the fill engine 132 to perform the filling operation.

On the other hand, if there is a match, it means the instruction block which contains the branch target is already in higher level memory 124, and the matched row number (BNX) and the branch target instruction's offset within the row (BNY) (i.e., together named BN) is placed onto bus 149 to be written to a track table entry. This entry is indexed by WXADDR 153 (row address) and bus 143 from the generator 130 (column address) which corresponds to the offset of the branch instruction in its own instruction block. Thus, after all instructions from an instruction block are scanned and processed, entries indexed by the same WXADDR in active list 121, track table 126, and higher level memory 124 contain information corresponding the same instruction block.

More particularly, higher level memory 124 includes the entire instruction block to be fetched by CPU core 125; active list 121 includes block (upper) address of the instruction block to be matched with subsequent instructions; and track table 126 includes all branch points within the instruction block, including their positions within the instruction block, and the BN values of their target addresses. A BN value includes a row address BNX and a column address BNY.

Figure 9:
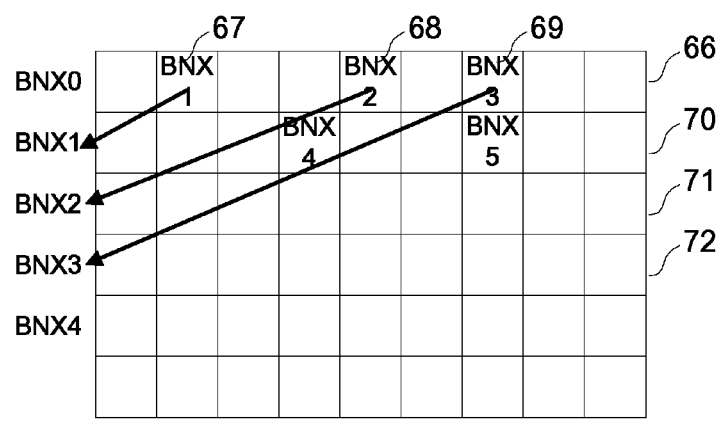
FIG. 9 illustrates an exemplary method to create new tracks consistent with the disclosed embodiments.

FIG. 9 shows an exemplary method to create new tracks using track table 126 consistent with the disclosed embodiments. As shown in FIG. 9, an existing track 66 (denoted as BNX0) may include three branch instructions or branch points 67, 68, and 69. When examining branch point 67, a new track 70 (next available row denoted as BNX1) is established to contain the target instruction of branch point 67, and the track number or the row number in track table 126 (i.e., BNX1) is recorded in branch point 67 as the first address. Similarly, when examining branch point 68, another new track 71 (denoted as BNX2) is created in track table 126 and the track number is recorded in branch point 68; when examining branch point 69, another new track 72 (denoted as BNX3) is created in track table 126 and the track number is recorded in branch point 69.

Therefore, new tracks corresponding to all branch points in a single track may be created. Further, track table 126 may be big enough to hold tracks for all block numbers and a new track number can be obtained by increase a largest used track number by one (1). Optionally, a track may correspond to various numbers of instructions based on a certain track granularity (a large granularity may allow a large number of instructions in an instruction block to be represented by a smaller number of entries in a single track or row).

Figure 7B:
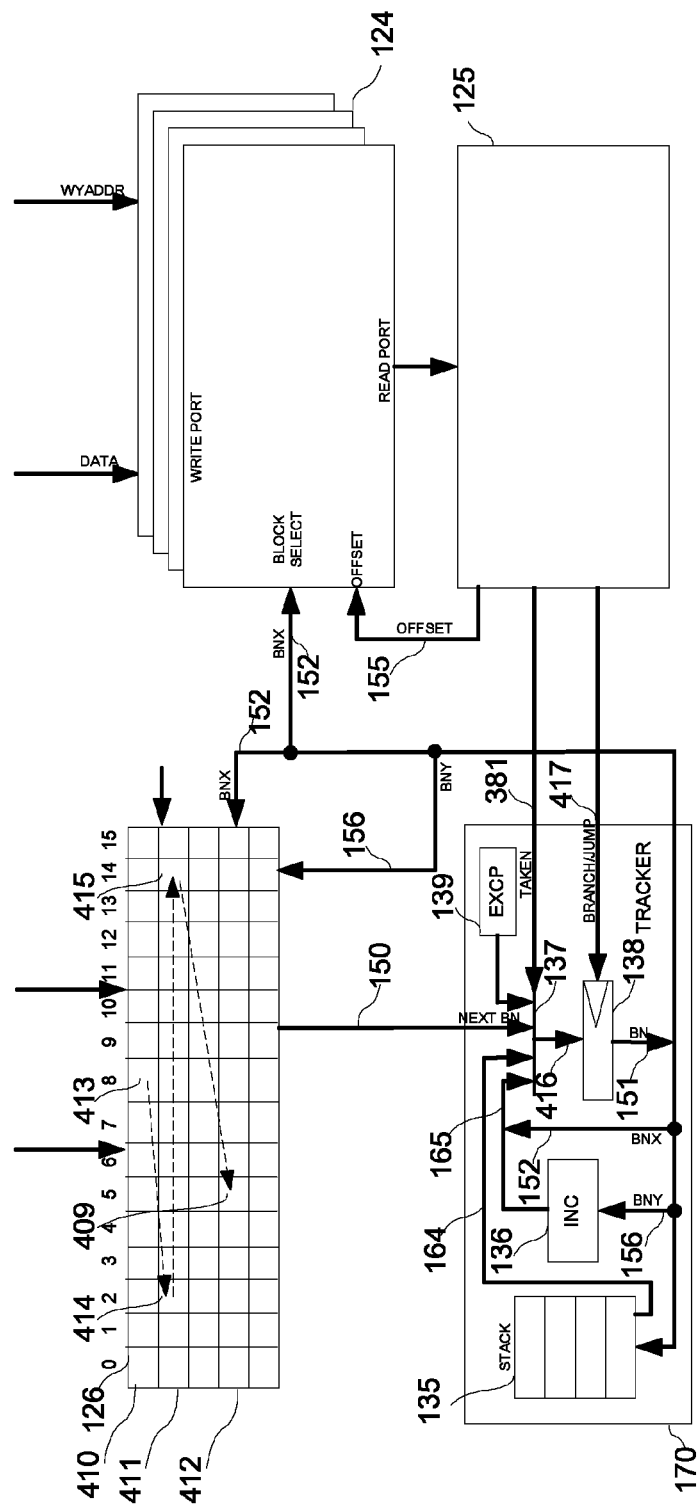
FIG. 7B illustrates a part of an exemplary cache system consistent with the disclosed embodiments.

Returning to FIG. 7A, continuing the operation, tracker 170 may output a BN 151 to be used to address track table 126 and higher level memory 124. That is, tracker 170 may be provided to coordinate operations of track table 126, higher level memory 124, and CPU core 125. FIG. 7B shows a part of cache system 8000 for illustrating such operations.

As shown in FIG. 7B, tracker 170 includes a stack 135, an incrementer 136, a multiplexer 137, a register 138, and an exception handler address register 139. During operation, tracker 170 controls a read pointer of track table 126. That is, tracker 170 outputs an address (i.e., BN 151) to be used to address track table 126 and higher level memory 124. BN 151 includes BNX 152 and BNY 156. BNX 152 may be used to address a row or a track from track table 126 and to address a memory block of higher level memory 124; while BNY 156 may be used to address an entry from a track or row in track table 126 pointed by BNX 152.

Tracker 170 may output BN 151 selected from different sources by multiplexer 137. For example, multiplexer 137 may include four input BN sources: a stored BN from stack 135 on bus 164, a new BN on bus 165 generated from current BNX 151 with an incremented BNY from incrementer 136 using current BNY 156, a BN from track table 126 on bus 150, and a BN from exception handler register 139. Other sources may also be included. As explained previously, the stored BN from stack 135 may be a BN corresponding to an instruction address used in the return of a function call, and the BN from exception handler register 139 corresponds to an exception handler address. All BNs inputted into multiplexer 137 include a BNX and a BNY.

Further, multiplexer 137 is controlled by signal 381 from CPU core 125 to select a particular BN on output 418. For example, when CPU core 125 incurs an exception, signal 381 controls multiplexer 137 to select the BN from exception handler register 139 as the output 418; when CPU core 125 performs a return of a function call, signal 381 controls multiplexer 137 to select the BN from stack 135 as the output 418; when CPU core 125 takes a branch (signal 381 becomes a taken indicator), signal 381 controls multiplexer 137 to select the BN from track table 126 as the output 418; and when CPU core 125 does not take a branch or during normal operation, signal 381 controls multiplexer 137 to select the BN 165, whose BNX 152 is unchanged but BNY is incremented by incrementer 136 as the output 418.

Bus or output 418 (i.e., the next BN) from multiplexer 137 may optionally be stored in register 138 and providing updated tracker output 151, controlled by signal 417 from CPU core 125. When signal 417 controls register 138 to keep the current BN 151 unchanged, the output 418 is not outputted from register 138. On the other hand, when signal 417 controls register 138 to update the current BN 151, the output 418 is then provided on bus 151 to become the current BN 151 as to update both BNX 152 and BNY 156.

Tracker 170 provides BN 151 including BNX 152 and BNY 156. BNX 152 is provided to address the instruction block, and CPU core 125 uses an offset of PC to fetch the instruction for execution. Also, BNX 152 and BNY 156 are provided to track table 126 such that track table 126 provides next BN on bus 150.

To illustrates interactions between track table 126 and tracker 170, track table 126 may include track (i.e., row) 410, 411, and 412, as shown in FIG. 7B. Each track may include 16 entries or track points from entry 0 to entry 15. Further, track point 413 (entry 8 of track 410) may be a branch point with a branch target track point 414 (entry 2 of track 411), and track point 415 (entry 14 of track 411) may be another branch point with a branch target track point 416 (entry 5 of track 412).

Assuming instruction block corresponding to track 410 was filled into higher level memory 124 and CPU core 125 starts executing instructions at the beginning of track 410. That is, the program counter (PC) of CPU core 125 starts from the address of the instruction corresponding to entry 0 of track 410.

At the same time, assuming that tracker 170 also sends out a read pointer 151 with the BNX and BNY pointed at entry 0 of track 410 in track table 126. Other entry of track 410 may also be used. The content of the entry may be checked to indicate the type of instruction information and address information, etc.

When starting with entry 0 of track 410, as previously explained, because entry 0 of track 410 is not a branch point, tracker 170 keep BNX 152 unchanged while increasing BNY by one via incrementer 136 to provide a next BN, which corresponds to the next entry of track 410 in track table 410. Tracker 170 continues increasing BNY to proceed with the next entry of track 410 until reaching a branch point, e.g., track point 413 (entry 8 of track 410). During this period, because BNX is unchanged, the instruction block address is thus unchanged, and CPU core 1125 can continue fetching instructions from higher level memory 124 using the offset of PC.

After pointer 151 provided by tracker 170 reaches track point 413 (entry 8 of track 410), because track point 413 is a branch point, both source address (that is value of pointer 151) and target address are analyzed. If the instruction block containing the next instruction from the source address of the branch point and/or the instruction block containing the target address have not been filled into higher level memory 124, the instruction blocks are filled into higher level memory 124 for possible execution by CPU core 125.

In certain embodiments, because an entry in active list 121 is created when track table rows are created, the instruction block containing the next instruction from the source address and the instruction block containing the target address may have been filled into higher level memory 124 at the time tracker 170 reaches track point 413. That is, because next instruction is entry 9 of track 410 and the instruction block corresponding to track 410 has already been filled into higher level memory 124, no filling is needed for the next instruction to track point 413. Further, because track point 414 is already created in track table 126 and on active list 121, instruction block corresponding to track 411 containing the branch target (entry 2 of track 411) also has been filled into higher level memory 124.

Because the speed of CPU core 125 executing instructions is slower that the speed of tracker 170 moving through track points corresponding to the instructions, tracker 170 may wait or sync with CPU core 125 at the branch point. Further, track table 126 may provide the branch target as the next BN 150 (entry 2 of track 211) with BNX as 411 and BNY as 2, and signal 381 may provide an indication as to whether the branch is taken or not when the branch instruction of track point 413 is executed by CPU core 125.

If the branch is taken, as in this example, the next BN provided by track table on bus 150 is then used by tracker 170 as BN 151, with BNX pointing to track 411 and BNY pointing to entry 2 of track 411. BNX is also used as an address to the corresponding instruction block in higher level memory 124 such that CPU core 125 can start executing the instruction corresponding to entry 2 of track 411. If the branch is not taken, however, tracker 170 moves ahead as if the branch point is a simple non-branch point.

Similarly, starting from entry 2 of track 411, tracker 170 finds next branch point 415 (entry 14 of track 411) with a branch target of track point 416 (entry 5 of track 412). Operations are similar to branch point 413, as explained above. If branch is taken with respect to branch point 415 (entry 14 of track 411), CPU core 125 starts executing from track point 416. On the other hand, if the branch is not taken with respect to branch point 415, tracker 170 moves to entry 15 of track 411, which is the last entry of track 411.

When the entry is not a branch point but is a last instruction of the track, starting from the track point corresponding to the next instruction in the next track, tracker 170 may keep the value of BNX 152 unchanged while keep increasing BNY 1156 by one (1) to create new BNYs until a new BNY points to a first branch point from the next track.

Thus, track table 126 is created ahead of actual execution of instructions by CPU core 125, so that instructions can be filled in higher level memory 124 without delay to avoid or reduce penalties caused by cache miss. Other mechanisms, such as increasing track table operation speed, increasing granularity of BNY, reducing the number of entries in track table, e.g., using an entry of track table to represent multiple instructions, can be used separately or combined in above described embodiments.

The cache miss rate may be further improved using multiple branch levels in track table 126. For example, when reading out entries in a table row of track table 126, a branch track point is found and the instruction block corresponding to the branch target instruction of the branch track point is filled into higher level memory 124. A new track (level one) is also created in track table 126. Further, the new track is also examined, and the first branch track point of the new track is also found and the instruction block corresponding to the branch target instruction of the first branch track point of the new track is also filled into higher level memory 124. Another new track (level two) is then created in track table 126. Thus, two levels of branch points are used to fill higher level memory 124, and the fill operation may be further hided from CPU core 125. The level two tracks can also be created with respect to all potential execution outcomes of the first level track. That is, the level two tracks are not only created regarding a first branch point of the new track corresponding to the branch target instruction of the current branch point, but also created regarding a first branch point of the new track corresponding to the next instruction following the current branch point.

Further, various tracks with one or more levels may be created based on a distance to the current program count (PC). The distance may be represented by a total number of instructions in advance to the current instruction being executed by CPU core 125. That is, the tracks may be created to fill the instruction blocks corresponding to at least the total number of instructions determined by the distance, no matter how many levels of tracks are created to keep the filled instructions ahead of the execution with a preconfigured advance. Or the distance may also be represented by a distance from the current branch point. That is, the tracks may be created to fill the instruction blocks corresponding to at least the total number of instructions following the branch point (in both taken and not-taken possibilities) determined by the distance, no matter how many levels of tracks are created to keep the filled instructions ahead of the execution to cover any filling latency. Other parameters may also be used.

In addition, in certain embodiments, a plurality of memory blocks (e.g., instruction blocks and data blocks) may be filled into higher level memory 124 at the same time. When filling the plurality of instruction or data blocks, each block may be divided into multiple segments, and each segment may be assigned a priority. Thus, a single block does not need to be filled at once. Rather, segments of different blocks may be filled in an interleaved scheme according to the priority of an individual segment, which may be set based on what is needed by CPU core 125.

For example, if an instruction block is 256 words (1024 bytes) long, the instruction block may be divided into four segments, each containing 64 words (256 bytes). Thus, for an instruction block starting at 0x1FC00000, four segments start at 0x1FC00000, 0x1FC00100, 0x1FC00200, and 0x1FC00300, respectively. If CPU core 125 needs an instruction in the second segment 0x1FC00100, the priority of this segment 0x1FC001100 is set to high. Thus, the filling sequence may be set to 0x1FC00100, 0x1FC00200, 0x1FC00300, and 0x1FC00000 while filling the instruction block. Further, if there is an additional or second instruction block starting at 0x90000000 to be filled at the same time as the instruction block starting at 0x1FC00000, the second instruction block is also divided into four segments starting at 0x90000000, 0x90000100, 0x90000200, and 0x90000300, respectively. If CPU core 125 needs an instruction in the fourth segment (0x90000300), the fourth segment may have a high priority and the entire filling sequence may be set to 0x1FC00100, 0x90000300, 0x1FC00200, 0x90000000, 0x1FC00300, 0x90000100, 0x1FC00000, and 0x90000200 in an interleaved way. Further, more blocks and segments may be interleaved to fill higher level memory 124, and other configurations may also be used. Although the above example is used to fill the instruction block, the data block can be filled similarly. Further, the instruction block and the data block can be filled together interleavedly.

FIG. 10A shows another exemplary cache system 9000 consistent with the disclosed embodiments. Cache system 9000 is similar to cache system 8000 described in FIG. 7A. However, as shown in FIG. 10A, cache system 9000 includes an exchanger 133, and allocator 1200 in cache system 9000 includes a reserve list 120 in addition to active list 121.

A reserve list is similar to an active list and is used together with the active list to store track information of all branch instructions of a program such that the size of the active list and L1 cache can be reduced. More particularly, when a track corresponding to a branch point already exists, branch target of the track can be stored in the reserve list. When the execution flow is close to the branch point, the branch target track can then be established based on the stored information in the reserve list.

In certain embodiments, an active list stores established tracks (e.g., corresponding instruction blocks are filled into higher level memory 124), and a reserve list stores tracks to be established (e.g., corresponding instruction blocks have not been filled into higher level memory 124). That is, when a track is created, a track point may correspond to an entry in the active list (e.g., a BN) or an entry in the reserve list (a TBN). A 'TBN', as used herein, stands for 'tentative block number' or 'tentative BN' and refers to a block number in a different number space from that of a BN, such as a number space used in the reserve list versus a number space used in the active list. Thus, a TBN and a BN may be distinguished from each other. For example, a TBN and a BN may be distinguished by the most significant bit. When the track point (e.g., a branch point) includes a BN, the instruction block containing the branch target instruction is already filled into higher level memory 124. On the other hand, when the track point includes a TBN, the instruction block containing the branch target instruction is not yet filled into higher level memory 124. Thus, when a track includes several branch points, using TBN instead of BN may reduce the amount of memory fills and save L1 cache memory space because some of the branch target may never be reached.

Figure 12:
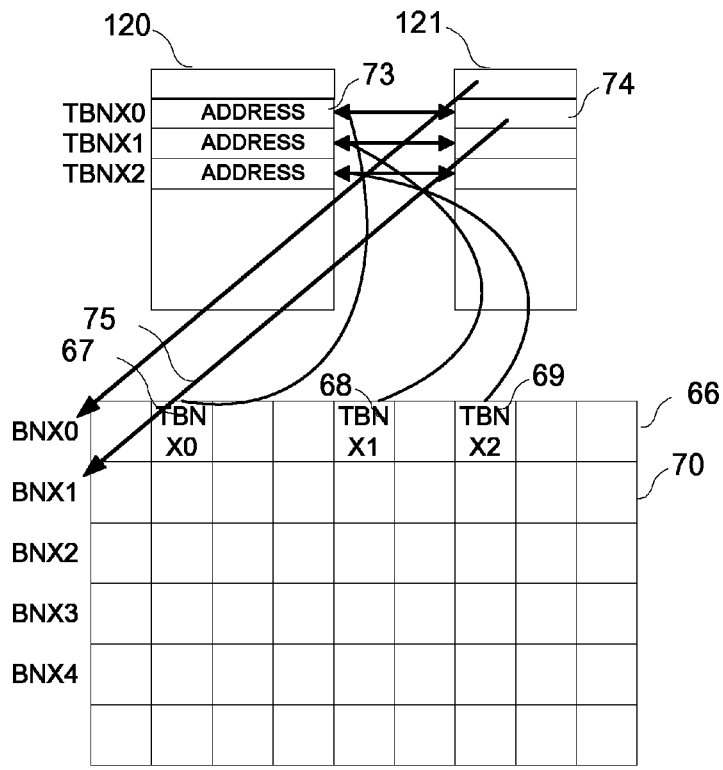
FIG. 12 illustrates an exemplary method to create new tracks consistent with the disclosed embodiments.

That is, a reserve list may be used to improve performance of the system and reduce storage capacity. FIG. 12 shows an exemplary method to create new tracks using track table 126, reserve list 120, and active list 121.

As shown in FIG. 12, existing track 66 (BNX0) may include three branch points 67, 68, and 69. For illustrative purpose, BNX numbers are used to denote tracks or rows in track table 1126. When examining branch point 67, an address of the target instruction of branch point 67 is stored in reserve list 120 as entry 73 (denoted as TBNX0), and the entry number of entry 73 (i.e., TBNX0) is recorded in branch point 67 as the first address. When examining branch point 68 and branch point 69, the addresses of the target instruction of branch point 68 and branch point 69 are also stored in reserve list 120 (denoted as TBNX1 and TBNX2). Similarly, entry numbers of those two entries are recorded in branch points 68 and 69, respectively, as the first addresses.

Further, when branch instruction 67 is to be executed by CPU core 125, the target address in entry 73 of reserve list 120 is moved into active list 121 as entry 74. In certain embodiments, a total entry number of active list 121 is the same as a total entry number of track table 126 such that a one-to-one relationship can be established between entries in active list 121 and entries in track table 126. Thus, according to relationship 75, a new track 70 which contains the branch target of branch point 67 in track table 126 can be created based on the corresponding entry (BNX1) in active list 121. The TBNX0 number in branch instruction 67 is also replaced by BNX1 so next time this instruction is about to be executed, the BNX1 can directly index the target track and corresponding memory block without a reference to reserve list.

Therefore, a new track is to be created only when the corresponding branch instruction is about to be executed or being executed. That is, before branch point 67 is executed, target addresses of branch points 68 and 69 are stored in reserve list 120 but new tracks corresponding to branch points 68 and 69 are not created.

Returning to FIG. 10A, when CPU core 125 starts up, a reset signal (not shown) sets '0' to the valid bit of entries of active list 121. When reset signal is released, a reset vector (reset startup instruction address) is placed on bus 141. Because both reserve list 120 and active list 121 cannot find a match address in the entries of reserve list 120 and active list 121, reserve list 120 puts the address on bus 144 for fill engine 132 to fetch the instruction block (e.g., reset vector) from lower level memory 122 through bus 154.

Pointer 129 points to a current entry of active list 121 through bus 153, and pointer 129 also points to an instruction or memory block of higher level memory 124 to store the fetched instruction block.

Also, track information associated with the instructions in the instruction block are extracted by generator 130 and written to a corresponding entries in track table 126 pointed by pointer 129 through address bus 153. After this filling operation is completed, the valid bit of current entry of active list 121 is set as '1'. Then pointer 129 moves to a next available entry in active list 121.

Generator 130 scans every instruction in an instruction block filled into higher level memory 124. When generator 130 finds a branch instruction, it calculates a target address of the branch instruction. The target address may be represented by the address of the instruction block containing the branch instruction (the source block address) plus an offset of the branch instruction from the source block address (the source offset), and also plus a branch distance from the source instruction to the target instruction (typically named as a branch offset). The upper part of the calculated target address is then matched with contents in both reserve list 120 and active list 121.

If there is no match in both reserve list 120 and active list 121, the upper part of the target address is written into an available entry in reserve list 120 pointed by pointer 127, and the value of pointer 127 together with the lower part of target address (the target offset address) (together know as TBN) is written into an entry in track table 126 determined by bus 153 (branch source row address) and bus 143 (branch source offset address). Bus 143 may provide a column address corresponding to the offset of the branch instruction in the filled instruction block.

If there is a match in reserve list 120, the matched value of pointer 127 together with the target offset as a TBN is then written into the entry in track table 126 determined by bus 153 (row address) and bus 143 (offset). If there is a match in active list 121, the matched active list entry number together with the target offset as a BN is then written into the entry in track table 126 determined by bus 153 (row address) and bus (offset). Instructions corresponding to target address in TBN is not yet filled to higher level memory 124 while instructions corresponding to target address in BN is already in higher level memory 124.

Repeating the above process until the entire instruction block is fetched into higher level memory 124. Thus, reserve list 120, active list 121, and track table 126 have information about the instruction block, and higher level memory 124 has the entire instruction block for use by CPU core 125. Active list 121 has starting (block) address of the instruction block for later instruction block match, and track table 126 includes all branch points in the instruction block and corresponding target TBNs or BNs.

When tracker 170 outputs a BN 151 to indicate an entry in track table 126, the content of the entry is read out through read port 161. If the content does not indicate a branch point, similar process to those described in FIG. 7A is used. However, if the content of the entry indicates a branch point, the branch target address (BN or TBN) is read out to exchanger 133.

Figure 13:
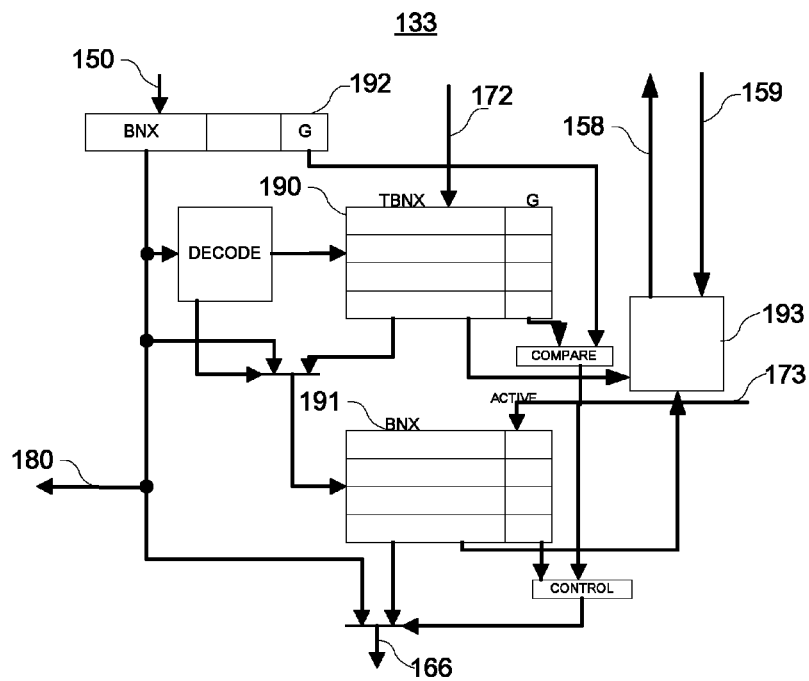
FIG. 13 illustrates an exemplary exchanger consistent with the disclosed embodiments.

Because the branch target address may correspond to an entry in reserve list 120 a TBN) or an entry in active list 121 (i.e., a BN), exchanger 133 may be used to exchange between entries in reserve list 120 and active list 121. The exchanger 133 sends only BN on bus 166 to tracker 170. The exchanger 133 sends TBNX on bus 180 to reserve list 120 to initiate the process to fill the corresponding memory block from lower memory to higher memory 124 and a BN is outputted after the exchange. This pre-filling ensures the instructions are in higher memory 124 when CPU needs them. FIG. 13 shows an exemplary exchanger consistent with disclosed embodiments.

As shown in FIG. 13, exchanger 133 includes a TBNX table 190 and a BNX table 191. Entries in TBNX table 190 may correspond to entries in active list 121 and may be used to map entries moved to reserve list 120 from active list 121. Each entry in TBNX table 190 may include an entry number of the corresponding entry in reserve list 120 and a flag G bit.

Entries in BNX table 191 may correspond to entries in reserve list 120 and may be used to map entries moved to active list 121 from reserve list 120. Each entry in BNX table 191 may include an entry number of the corresponding entry in active list 121 (i.e., BN) and a valid bit.

Further, track information outputted on bus 150 from track table 126 may also include a G bit 92, which corresponding to the G bit in TBNX table 190, indicating whether the BNX is currently in active list 121 for direct outputting, or a mapping may be needed.

When an entry in active list 121 is moved to reserve list 1120, a corresponding entry in TBNX table 190 is used to record entry number (BN) 172. Similarly, when an entry in reserve list 120 is moved to active list 121, a corresponding entry in BNX table 191 is used to record entry number of the entry and the valid bit is set to valid.

When track point information 150 includes entry number of reserve list 120, the entry number TBNX is used as an index to read out a BNX value and valid bit from BNX table 191. If the BNX value is valid (i.e., valid bit is set to valid), the BNX value is provided on output 166 and send to tracker. On the other hand, if the BNX value is not valid, the TBNX is used as an index to read content from reserve list 120 through bus 180 and initiate the process to fill the memory block corresponding to the TBNX from lower level memory 122 to higher level memory 124.

When track point information 150 includes entry number of active list 121 (i.e., BN), if the G bit in track point information 150 is the same as the G bit in corresponding entry in TBNX table 190, the BNX value is provided on output 166. On the other hand, if the G bit in track point information 150 is not the same as the G bit in corresponding entry in TBNX table 190, the entry number of reserve list 120 is read out from TBNX table 190 and is used as an index to read out a BNX value and valid bit from a corresponding entry in BNX table 191. If the BNX value is valid, the BNX value is provided on output 166. On the other hand, if the BNX value is not valid, the entry number of reserve list 1120 is used as an index to read content from reserve list 120 through bus 180.

Thus, as long as TBNX table 190 and BNX table 191 have valid entries, an exchange module 193 keeps scanning track table 126, reading track point information from bus 159. If the track point information of a track point includes an entry number of active list 121 and the entry number corresponds to a valid entry in TBNX table 190, the entry number of reserve list 120 is outputted on bus 158, and the track point information is changed to include the entry number of reserve list 120. Similarly, if the track point information of a track point includes an entry number of reserve list 120 and the entry number corresponds to a valid entry in BNX table 191, the entry number of active list 121 is outputted on bus 158, and the track point information is changed to include the entry number of active list 121.

By scanning the entire track table, exchanges between entries in TBNX table 190 and BNX table 191 can be achieved. Such exchanges may be carried in various situations. For example, if the active list reaches its capacity, it may also mean higher level memory 124 reaches its capacity. Certain memory blocks in higher level memory 124 may be replaced, and so is the active list. The replaced entries in the active list may be moved to the reserve list, and the BNX reference used in the track table may need to be exchanged into the new TBNX reference. After the exchange process, previous entries in TBNX table 190 and BNX table 191 may be set to invalid.

Returning to FIG. 10A, after the content of a branch point end to exchanger 133 and exchanger 133 performs it operation on the track table output 161, which means the instruction block containing the branch target instruction is already in higher level memory 124, the result BN is directly outputted to tracker 170. The further processing is similar to FIG. 7A, FIG. 10B shows a part of cache system 9000 for operations of track table 126, higher level memory 124, and CPU core 125 using reserve list 120 and active list 121.

Figure 10B:
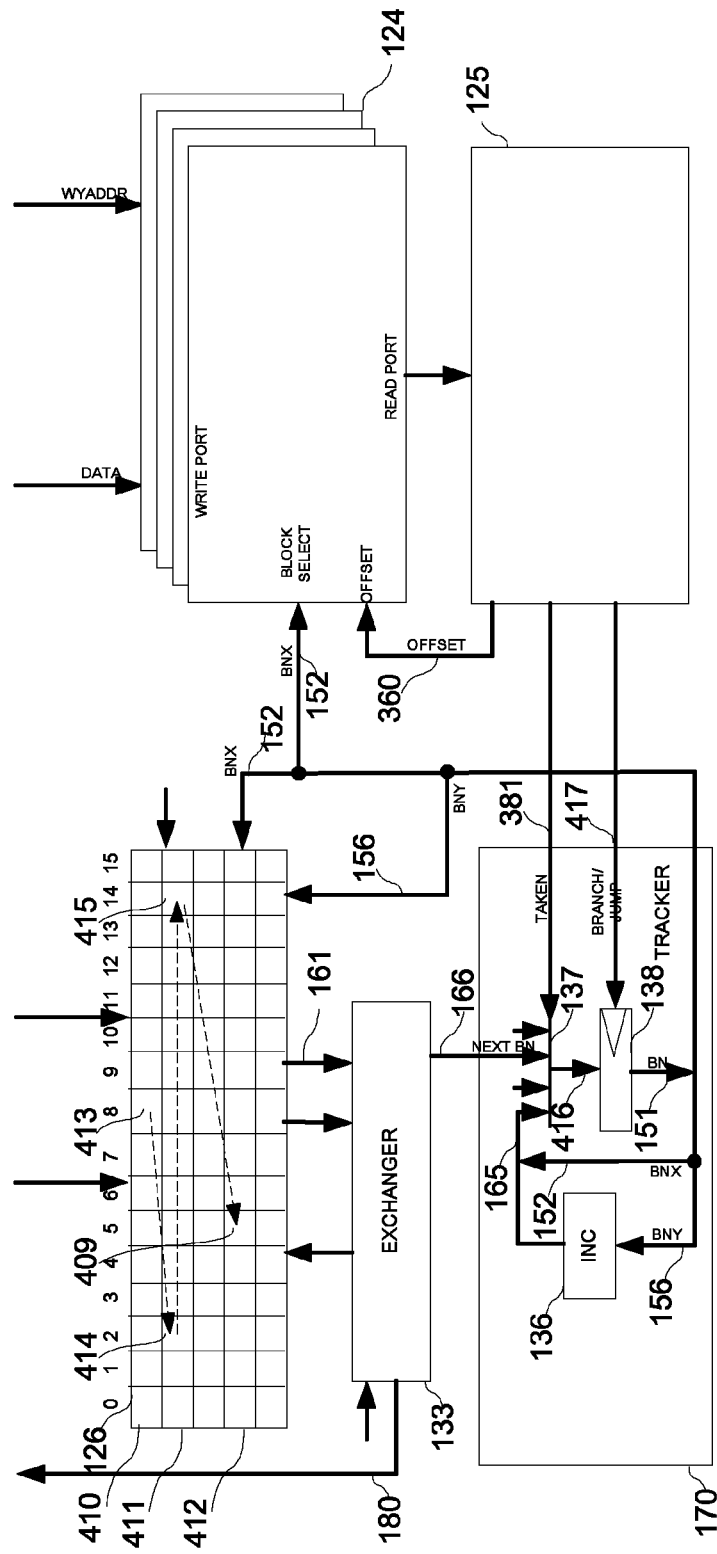
FIG. 10B illustrates a part of an exemplary cache system consistent with the disclosed embodiments.

As shown in FIG. 10B, similar to FIG. 7B, tracker 170 includes incrementer 136, multiplexer 137, and register 138. Other components are omitted for illustrative purposes. During operation, tracker 170 outputs an address (i.e., BN 151) to be used to address track table 126 and higher level memory 124. BN 151 includes BNX 152 and BNY 156. BNX 152 may be used to address a row or a track from track table 126 and to address a memory block of higher level memory 124; while BNY 156 may be used to address an entry from a track in track table 126 pointed by BNX 152.

Further, multiplexer 137 is controlled by signal 381 from CPU core 1125 to select, among other choices, a next BN 166 from exchanger 133 or the BN from incrementer 136 as the bus 418. Bus 418 (i.e., the next BN) from multiplexer 137 may optionally be stored in register 138 and controlled by signal 417 from CPU core 125. When signal 417 controls register 138 to keep the current BN 151 unchanged, the bus 418 is not outputted from register 138. On the other hand, when signal 417 controls register 138 to update the current BN 151, the bus 418 is then provided on bus 151 to become the current BN 151 as to update both BNX 152 and BNY 156.

To illustrates interactions between track table 126 and tracker 170, similar to FIG. 7B, track table 126 may include track (i.e., row) 410, 411, and 412. Each track may include 16 entries or track points from entry 0 to entry 15. Further, track point 413 (entry 8 of track 410) may be a branch point with a branch target track point 414 (entry 2 of track 411), and track point 415 (entry 14 of track 411) may be another branch point with a branch target track point 416 (entry 5 of track 412).

Assuming instruction block corresponding to track 410 was filled into higher level memory 124 and CPU core 125 starts executing instructions at the beginning of track 410. That is, the program counter (PC) of CPU core 125 starts from the address of the instruction corresponding to entry 0 of track 410.

At the same time, assuming tracker 170 also send out a read pointer 151 with the BNX and BNY pointed at entry 0 of track 410 in track table 126. Other entry of track 410 may also be used. The content of the entry may be checked to indicate the type of instruction information and address information, etc.

When starting with entry 0 of track 410, as previously explained, because entry 0 of track 410 is not a branch point, tracker 170 keep BNX 152 unchanged while increasing BNY by one via incrementer 136 to provide a next BN, which corresponding to the next entry of track 410 in track table 410. Tracker 170 continues increasing BNY proceed with the next entry of track 410 until reaching a branch point, e.g., track point 413 (entry 8 of track 410). During this period, because BNX is unchanged, the instruction block address is thus unchanged. CPU core 125 can continue fetching instructions from higher level memory 124 using the offset from PC.

After pointer 151 provided by tracker 170 reaches track point 413 (entry 8 of track 410), because track point 413 is a branch point, both source address (that is value of pointer 151) and the content of the entry such as target address are analyzed. Exchanger 133 may check with the target address is in the form of BN or TBN. If the target address is a BN, the instruction block corresponding to the target address was already filled in higher level memory 124 ready to be read by core 125. On the other hand, if the target address is a TBN, the instruction block corresponding to the TBN has not been filled into higher level memory 124 yet. Thus, if the instruction block corresponding to the TBN is not in higher level memory 124, the instruction block is filled in higher level memory 124. Also, as explained above, exchanger 133 converts the TBNX to a BNX and assign the value of TBNY to BNY. Then a BN is provided by exchanger 133, which may be provided on bus 166 to be used next BN. Whether the content of the entry is a BN or a TBN, exchanger 133 will provide a BN as next BN 166.

In addition, if the instruction block containing the next instruction from the source address has not been filled into higher level memory 124, the instruction block is also filled into higher level memory 124 for possible execution by CPU core 125. With respect to point 413, however, because next instruction is entry 9 of track 410 and the instruction block corresponding to track 410 has already been filled into higher level memory 124, no filling is needed for the next instruction to track point 413. Thus, only instruction block corresponding to track 411 containing the branch target (entry 2 of track 411) is filled into higher level memory 124, if not already filled.

Because the speed of tracker 170 moving through track points corresponding to the instructions is faster than the speed of CPU core 125 executing instructions, both instruction blocks to be executed by CPU core 125 can be filled into higher level memory 124 before CPU core 125 executes any instructions in either instruction block. Thus, no cache miss may incur. The BNY 156 may be treated as a part of a look-ahead pointer (BNX may be unchanged within the same track) to fill higher level memory 124 with all instructions that could be executed by CPU core 125 before any relevant instruction is actually executed by CPU core 125.

That is, because the TBNX on reserve list 120 does not automatically fill higher level memory 124, tracks or entries in track table 126 can be created in a large number and in small amount of time. Instructions are filled into higher level memory 124 when the execution flow goes near to the instruction, e.g., instructions of a branch target.

Further, after reaching track point 413 and relevant instruction block(s) is filled into higher level memory 124, track table 126 or exchanger 133 may provide the branch target as the next BN 166 (entry 2 of track 211) with BNX as 411 and BNY as 2, and tracker 170 may wait for the branch instruction of track point 413 being executed by CPU core 125 such that signal 381 may provide an indication as to whether the branch is taken or not.

If the branch is taken, as in this example, the next BN provided by track table 126 or exchanger 133 on bus 166 is then used by tracker 170 as BN 151, with BNX pointing to track 411 and BNY pointing to entry 2 of track 411. BNX is also used as an address to the corresponding instruction block in higher level memory 124 such that CPU core 125 can start executing the instruction corresponding to entry 2 of track 411. If the branch is not taken, however, tracker 170 or the look-ahead pointer moves ahead as if the branch point is a simple non-branch point.

Similarly, starting from entry 2 of track 411, tracker 170 finds next branch point 415 (entry 14 of track 411) with a branch target of track point 416 (entry 5 of track 412). The instruction block corresponding to track 412 is then filled into higher level memory 124 if not already filled, and the look-ahead pointer waits for execution of branch instruction of track point 415, as explained above.

In addition, the above discussion is based on one-level track operation. That is, the look-ahead pointer stops at the first branch point, thus the filling operation is performed with respect to the two possible branch results of the first branch point. Track table 126 may also support two-level track operation or multi-level track operation. For example, in a two-level track operation, the look-ahead pointer may stop at the first branch point after the branch target of the first branch point. Thus, instructions corresponding to all four possible branch results of the two branch points are filled in higher level memory 124. Similarly, more instructions can be filled with multi-level track operation.

It is understood that, although reserve list 120, active list 121, and exchanger 133 are used to provide the flexibility and effectiveness of filling operation of higher level memory 124, as previously explained, a single list or any other structure may be used for the implementation.

Further, returning back to FIG. 10A, in operation, more tracks may be added into track table 126 and corresponding instructions being filled into higher level memory 124. However, the capacity of track table 126 and/or higher level memory 124 to be filled may be limited. A replacement scheme may be needed to replace tracks or entries in track table 126 and/or instruction blocks filled into higher level memory 124. For example, a replacement scheme based on active list 121, reserve list 120, and track table 126 may be used. More particularly, replaceable entries in active list 121 may be determined.

If, through bus 180, content with TBNX value '118' in a entry of track table 126 is used to fill an instruction block into higher level memory 124, the TBNX value of '118' corresponds to an instruction block address 0x1FC0 in reserve list 120, and active list 121 has an entry with a BNX value of '006' as pointed by bus 153, which corresponds to an instruction block address 0x4000. Thus, the address 0x1FC0 from reserve list 120 is read into bus 144 to replace the address 0x4000 in active list 121, and the address 0x1FC0 is further sent to fill-engine 132 to fill the instruction block from the address 0x1FC0 into higher level memory 124 to replace the instruction block from the address 0x4000. Further, the entry with the BNX value of '006' corresponding address 0x4000 is moved to an entry of reserve list 120 pointed by pointer 127.

A replacement policy may also be used to determine which track or storage unit of track table 126 should be replaced. For example, a least recently used (LRU) policy or a least frequently used (LFU) policy may be used. When the LRU policy is used, each track or track point may include a usage bit (U bit); when the LFU policy is used, each track or track point may include a count to record usages.

Figure 11:
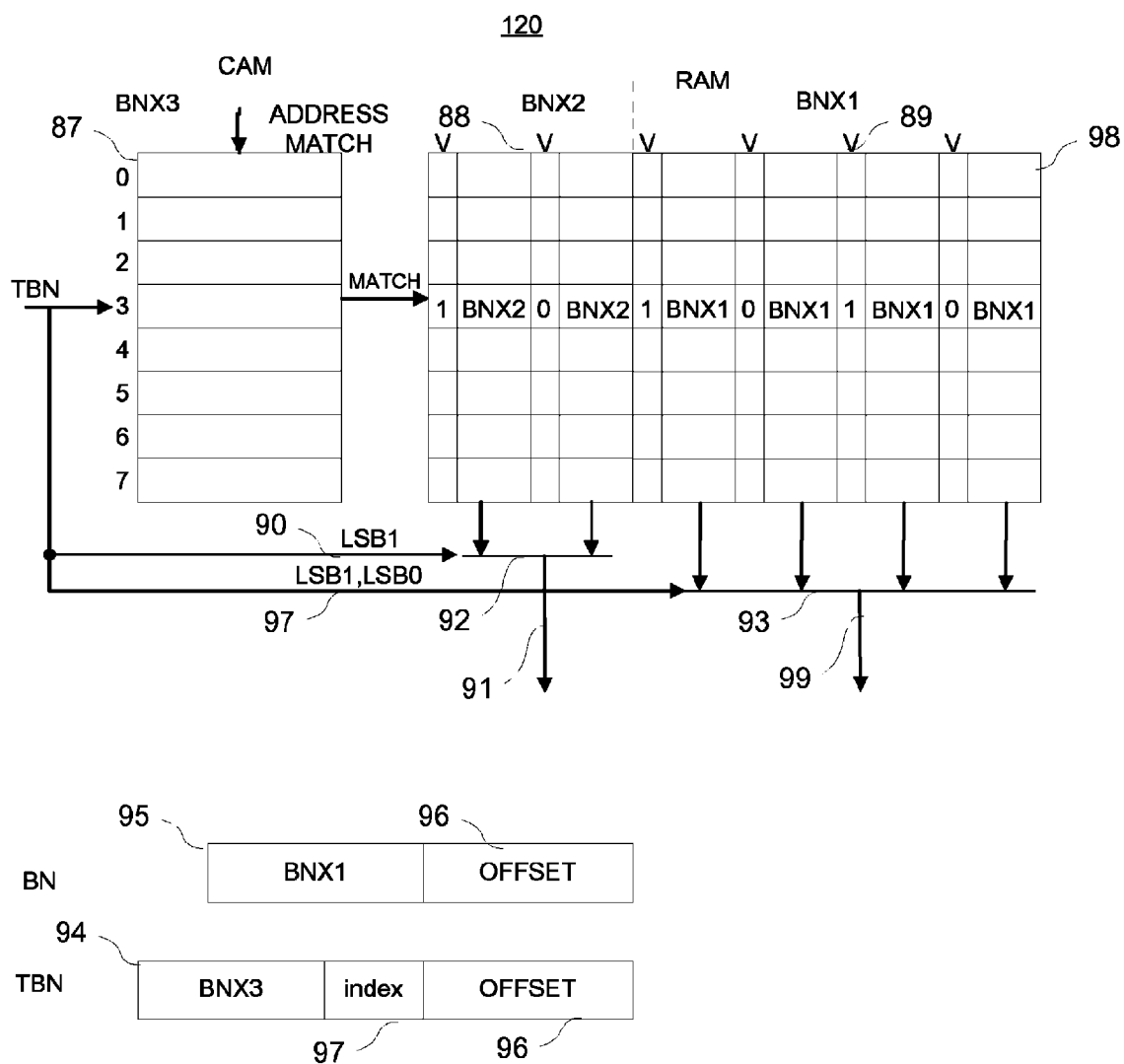
FIG. 11 illustrates an exemplary allocator or reserve list for multi-level cache structures consistent with the disclosed embodiments.

In certain embodiments, more than one level of cache structures may be used. Allocator 1200 or active list 121 may be configured to support more than one level of cache structure. FIG. 11 shows an exemplary allocator or active list for multi-level cache structures.

A total of three levels of cache memories may be used for illustration, a level-one memory, a level-two memory, and a level-three memory (not shown). For illustrative purposes, assuming three levels of cache memories are used as instruction memories (data memories are similar). The memory block or line size in level-two memory may be twice the memory block size in level-one memory (i.e., one level-two memory block may include two level-one memory blocks), and the memory block size in level-three memory may be twice the memory block size in level-two memory (i.e., one level-three memory block may include two level-two memory blocks and four level-one memory blocks). Level one memory is coupled to CPU core 125 as a higher level memory module. Other different number of levels of cache memories may also be used.

In addition, also for illustrative purposes, the level-three memory may include all contents in both the level-two memory and level-one memory (i.e., inclusive), and the level-two memory may or may not include contents in the level-one memory. Although not shown, a track table may be used to create a track of instructions which may be in one of the three levels of memory, and each track point (e.g., a branch point) may contain an address (e.g., target branch address) to be represented in one of two formats as shown in FIG. 11. One address format includes two fields, from most significant bits to least significant bits, a block address part for addressing blocks in the level-one memory, and an offset part for addressing within the track or memory block. The other address format includes three fields, a block address part for addressing blocks in the level-three memory, an index part, and an offset part.

As shown in FIG. 11, allocator 1200 or reserve list 120 may include a content addressable memory (CAM) 87 and a random accessible memory (RAM) 98. CAM 87 may include one column and each entry in CAM may correspond to a block number BNX3 of a level-three memory block. That is, each entry may include a memory address of a particular level-three memory block corresponding to the particular BNX3.

Further, RAM 98 may include a total of six columns, two columns 88 are used for storing block numbers BNX2 of two level-two memory blocks corresponding to a particular level-three memory block and valid bits V, and the other four columns 89 are used for storing track number BNX1 of level-one memory and valid bits V corresponding to the level-three memory block. Multiplexer 93 may select a particular level-one block number or track number corresponding to the level-three memory block based on index 97. Similarly, multiplexer 92 may select a particular level-two block number or track number corresponding to the level-three memory block based on index 97 or, more specifically, high bit LSB1 (90) of index 97.

This list may be addressed in two ways. One way is using a memory address level-three memory block address) to search CAM 87. If an address match is found, the entry in CAM is selected, and the contents of corresponding RAM 98 can also be read out. The other way is using a first address BNX3 (94) of a level-three block address (TBN) to direct address CAM 87 and/or RAM 98 to read out contents of a selected row of CAM 87 and/or RAM 98.

When filling the three levels of cache memories from a main memory or any external memory, as previously explained, the being filled instructions are scanned and examined. When a branch instruction is found, the branch target address of the branch instruction is compared with level-three memory block addresses in CAM 87.

If there is no match, it may indicate that there is no instruction block containing the branch target address in the level-three memory. A memory block in the level-three memory may be chosen according to certain criteria, such as a replacement policy, to be filled with the instruction block containing the branch target address. At the same time, the block address of the chosen memory block in level-three memory may be used in the level-one track for the track point corresponding to the branch point. The block number of the chosen memory block in level-three memory is used as the first address BNX3 (94), the index part of the memory address is used as the index (97), and the offset part of the memory address is used as the offset (BNY) (96). Further, index 97 may include 2 bits, a high bit LSB1 (90) is used to differentiate two corresponding memory blocks in the level-two memory and the high bit LSB1 and a low bit LSB0 together (97) are used to differentiate four corresponding memory blocks in the level-one memory.

On the other hand, if there is a match, it may indicate that there is a corresponding instruction block in at least the level-three memory. The matched BNX3 and the index part and the offset part of the memory address may then be recorded in the track table entry.

In operation, when the above track table entry is read by the look-ahead pointer, the table entry or the track point indicates the target branch address is a TBN of level-three memory. The first address of the TBN (BNX3) may then be used to address the entries in CAM 87 and/or RAM 98.

More particularly, the first address 94 (BNX3) of the level-three track is used to address RAM 98 and read out corresponding two level-two block numbers and valid bits and four level-one block numbers and valid bits. A multiplexer 93 may select a valid level-one track number from the four level-one block numbers based on the index bits 97 (i.e., LSB1, LSB0) and the valid bits V. Further, a multiplexer 92 may select a valid level-two block number from the two level-two block numbers based on the high bit 90 (i.e., LSB1) and valid bits V.

If a valid level-one track number is selected, which means the instruction corresponding to the target address is already filled into the level-one memory, the valid level-one track number is then provided on bus 99 to replace the first address of the branch instruction. Also, the index is discarded and the offset (BNY) is kept unchanged. The TBN thus becomes a BN. Further, BNX3 (94) alone may be insufficient to determine a level-one block number because a level-three memory block may include four level-one memory blocks. BNX3 is used together with index (97) to determine a particular level-one memory block. Among the four corresponding level-one memory blocks, zero, one, two, three, or four memory blocks may contain contents from the corresponding level-three memory block. Similarly, among the two corresponding level-two memory blocks, zero, one, or two memory blocks may contain contents from the corresponding level-three memory block.

On the other hand, if no valid level-one block number is selected, which means the instruction corresponding to the target address is not yet filled into the level-one memory. If a valid level-two block number is selected, which means the instruction corresponding to the target address is already filled into the level-two memory, the valid level-two block number is then provided on bus 91. The instruction block corresponding to the level-two block number from bus 91 may then be filled into level-one memory from level-two memory, and the respective level-one block number and valid bit in RAM 98 are updated to indicate the filled instruction block. For example, the level-one block number (BNX1) and its valid bit may be updated in RAM 98 in the entry pointed by BNX3 and the index, and the track table entry is also updated to use the BN number of level-one track. The BN number includes a first address (i.e., BNX1) and a second address (i.e., offset or BNY).

If no valid level-two track number is selected, which means the instruction corresponding to the target address is not already filled into the level-two memory, the instruction block corresponding to the level-three track number may then be filled into the level-two memory and level-one memory from the level-three memory. The respective fields in RAM 98 are also updated to indicate the filled instruction block in the level-one memory and the level-two memory. For example, the level-one block number (BNX1) and its valid bit may be updated in RAM 98 in the entry pointed by BNX3 and the index, and the track table entry is also updated to use the BN number of level-one track. The level-two block number (BNX2) and its valid bit may also be updated in RAM 98 in the entry pointed by BNX3 and the index if corresponding level-two memory block is also filled.

When the instruction block is filled, the instruction block may first be filled into level-two memory from level-three memory, and then be filled into the level-one memory from the level-two memory. Or, alternatively, the instruction block may be filled into level-two memory from the level-three memory, and at the same time be filled into level-one memory from the level-three memory if a separate path between the level-three memory and the level-one memory exists. Further, if track points in level-one memory only includes level-one track information, operations involving the track points are similar to those explained previously.

Figure 14A:
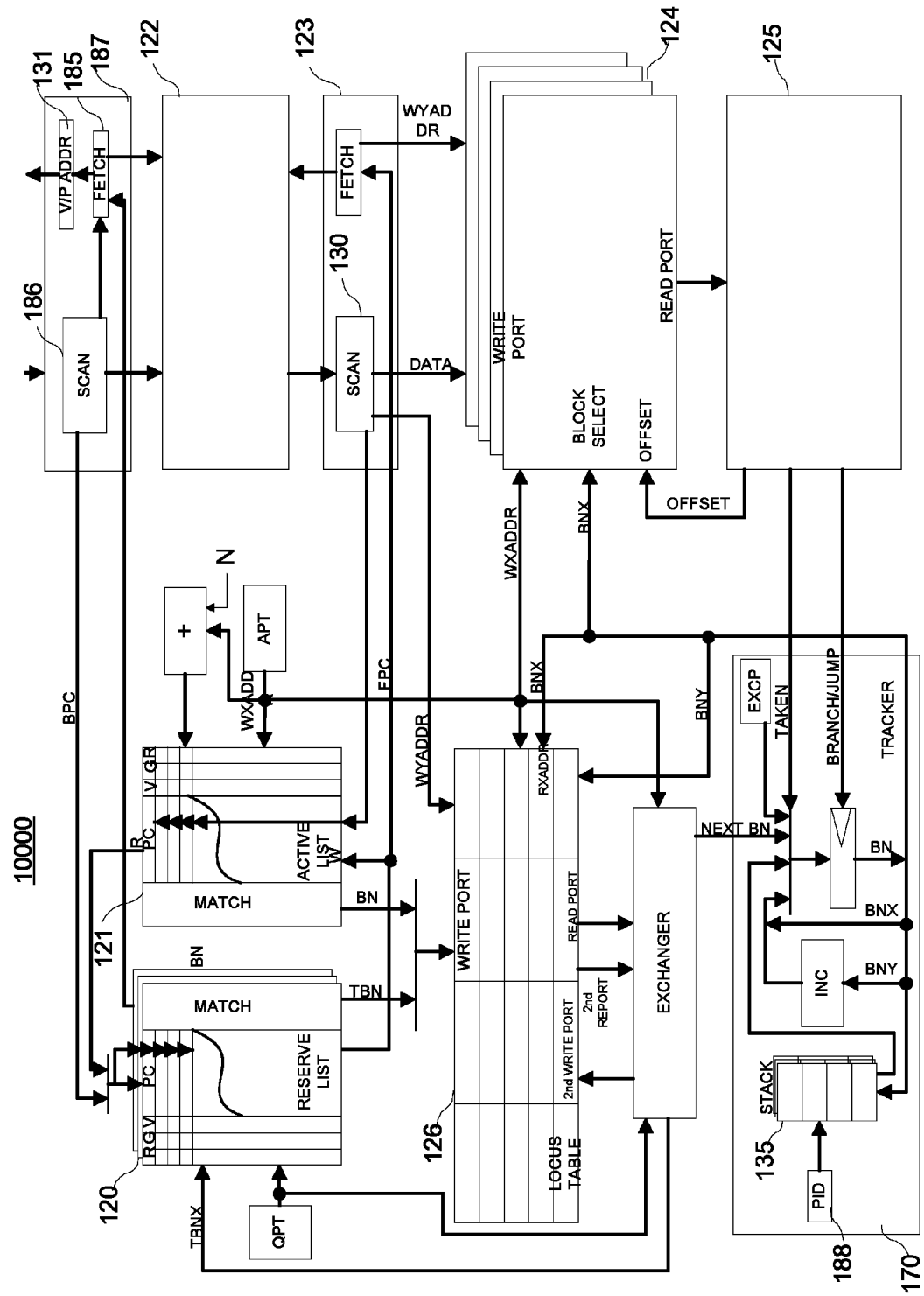
FIG. 14A illustrates another exemplary cache system consistent with the disclosed embodiments.

FIG. 14A shows another exemplary cache system 10000 consistent with the disclosed embodiments. Cache system 10000 may be similar to cache system 9000 described in FIG. 10A. However, cache system 10000 includes certain features to support multi-thread programming.

Individual tracks in track table 126 may correspond to a single thread or to multiple threads. Because operational status needs to be saved and recovered during thread context switching, a plurality of stacks 135 are used to keep information pushed into a particular stack by a single thread. A thread identifier (PID) 188 stores a current thread or thread number. When tracker 170 uses stacks 135, PID 188 provides a pointer to the stack to be used such that correct stack operation can be performed.

Further, a second fill/generator 187 may be provided outside lower level memory 122. Generator 186 in fill/generator 187 is similar to generator 130 in fill/generator 123, but with higher bandwidth than that of generator 130. More instructions may thus be scanned and analyzed at one time by generator 186. In addition, fill/generator 187 operates on reserve list 120 in similar ways by which fill/generator 123 operates on active list 121. That is, instruction blocks corresponding to addresses in reserve list 120 are filled by filling engine 185 into lower level memory 122 from a further lower level memory (not shown). Thus, instruction blocks corresponding to addresses in reserve list 120 are in lower level memory 122 to reduce or avoid the waiting time for CUP core 125 to fetch instructions.

In addition, different tracks may correspond to a same instruction block (a same instruction block may be placed in different L1 cache memory blocks according to different virtual address). Fill/generator 187 also includes a translation look-aside buffer (TLB) 131 placed outside filling engine 185 such that instructions in lower level memory 122 and higher level memory 124 are all in physical addressing mode and CPU core 125 can directly fetch the instructions in higher level memory 124 without the need of virtual to physical translation.

Figure 14B:
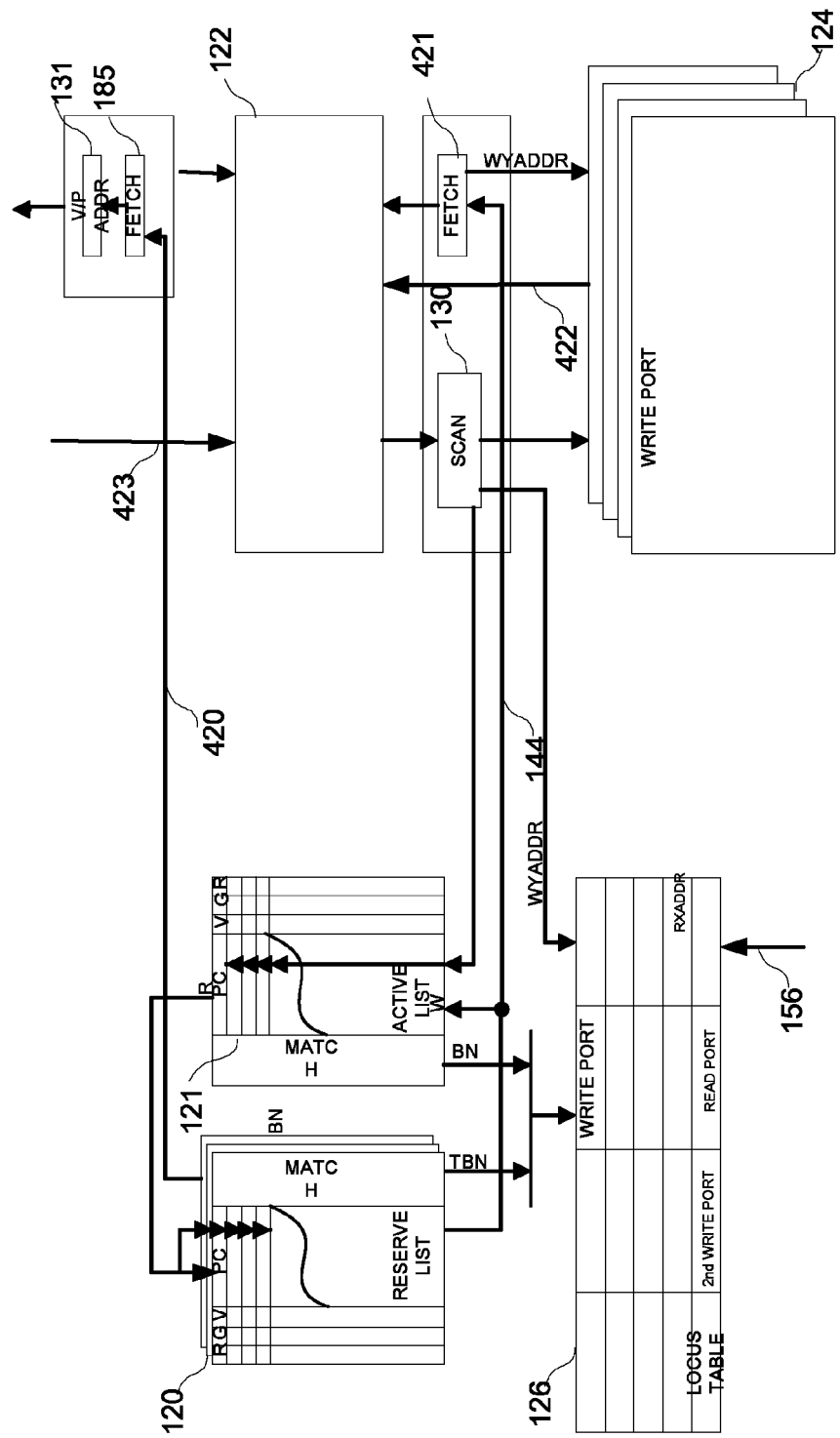
FIG. 14B illustrates a part of an exemplary cache system consistent with the disclosed embodiments.

FIG. 14B shows a part of cache system 10000 consistent with the disclosed embodiments. As shown in FIG. 14B, each entry in active list 121 may correspond to a memory block or instruction block in higher level memory 124 and also to a track in track table 126. Thus, higher level memory 124 may be managed through active list 121. On the other hand, lower level memory 122 may also be used as a cache, and lower level memory 122 is managed through reserve list 120. That is, each entry in reserve list 120 may correspond to a memory block or instruction block in lower level memory 122. Further, for illustrative purposes, assuming higher level memory 124 and lower level memory 122 are exclusive. In other words, a memory address or memory block is not included in both higher level memory 124 and lower level memory 122.

When instructions are filled into higher level memory 124, generator scans and examines the instructions, and a track may be created in track table 126 including a branch point. The target branch address may be matched with entries in active list 121. If there is a match, meaning that a corresponding instruction block is already filled in higher level memory 124, the target branch address is recorded as the matched block number of higher level memory 124, in BN format, in track table 126. However, if there is no match, a corresponding instruction block is not yet filled in higher level memory 124, and the target branch address may be matched with entries in reserve list 120 to initiate a fill process. Optionally, the target branch address may be matched with entries in reserve list 120 simultaneously with the active list 121.

If there is a match in reserve list 120, meaning that a corresponding instruction block is already filled in lower level memory 122, the target branch address is recorded as the matched block number of lower level memory 122, in TBN format, in track table 126. If there is no match in either reserve list 120 or active list 121, fill engine 185 may fill the corresponding instruction block from an external memory (not shown) into lower level memory 122 through bus 423. Virtual to physical address translator 131 may provide virtual and physical address conversion or translation. The filled memory block in lower level memory 122 may thus contain the corresponding instruction block, and the target branch address is recorded as the filled block number of lower level memory 122, in TBN format, in track table 126.

In operation, when the look-ahead pointer (156) reaches a branch track point in track table 126 that includes a TBN branch target address, as previously explained, a BN will be created in active list 121 and the corresponding instruction block is filled into higher level memory 124 from lower level memory 122. Further, the TBN in track table 126 is replaced by the BN and the TBNX of the TBN in reserve list 120 is removed.

Thus, when an instruction block corresponding to an entry in reserve list 120 is filled into higher level memory 124, the associated TBN is replaced by a new BN. Similarly, when an instruction block corresponding to an entry in active list 121 is swapped out or filled back into lower level memory 122, the associated BN can just be replaced by a new TBN. By switching between entries of reserve list 120 and active list 121, significant efficiency may be achieved in a multi-level cache arrangement.

Although various embodiments are separately disclosed with respect to various drawings, these various embodiments may be independently implemented or may be implemented in certain combination. Thus, the various components illustrated in those embodiments may also be used independently or in combination, without departing the principles of the disclosed embodiments. The followings list certain implementations for illustrative purposes.

For example, generator 130 may be configured to extract a branch source address to be used to address the writing of track table 126. A source address (e.g., a instruction address) may be analyzed in two formats. One format is to represent the address with an upper address part, an index part, and an offset part in situations such as having multiple cache levels or memory level, and the other format is to represent the address with an upper or block address part and an offset part. In certain embodiment, the branch source address may be represented in an upper address part, an index part, and an offset part. Further, the offset part is used directly as BNY, and the upper address and Index are sent to allocator 1200 to be converted to a block number. Generator 130 may also be configured to extract instruction types (e.g., unconditional branch, conditional branch, non-branch (including load, store, etc.)).

Further, generator 130 may be configured to compute a branch target address as the branch source address plus a branch offset, wherein the branch source address may be a block address of the instruction block containing the branch source address plus an offset of the branch source instruction within the block, and the offset of the branch source instruction may be a jump amount. The upper address and index of the branch target address are put on bus 141 to match with content of allocator 1200 (e.g., active list 121, reserve list 120) CAM. Also, the offset address is put on bus 143 WYADDR as the Y write-address for track table 126. A write address for track table 126 may refer to an address used to create a track point entry in track table 126 including a row address (X address) and a column address (Y address) which correspond to XADDR and YADDR, respectively.

That is, generator 130 provides the branch source address as the write address of track table 126, and instruction type and branch target address as the content of track table 126. All such addresses are generated by generator 130 except the X write address, which is converted or assigned by allocator 1200. The X address may be a block number (BN) corresponding to a particular upper address, which itself may be too long and not continuous. For example, a 18-bit upper address corresponds to 256K different memory blocks, while assigning them to 256 blocks results in the BNX number for only 8 bits.

Track table 126 may be configured as a two dimensional table, in which each row, addressable by an X address or first address BNX, is corresponding to one memory block or memory line, and each column, addressable by a Y address or 2nd address BNY, is corresponding to the offset of the corresponding instruction (data) within memory blocks. In short, the track table write-address corresponds to the branch source instruction address. Further, for a particular branch source address (e.g., upper address, index, offset), a BNX 153 is assigned by allocator 1200 (i.e. active list 121) based on the upper address and index, and BNY is the same as the offset. The BNX and BNY may then form the write address used to point to a table entry for writing.

Further, for the branch point, a branch target address (upper address, offset) is sent to active list 121 to match the upper address part, and active list 121 may assign a BNX. The assigned BNX, together with the instruction type from generator 130 and the offset (BNY), form the content of the track table entry of the branch source instruction.

Track table 126 may also be configured for other purposes. For example, track table 126 may support an automatic power management for CPU core 125 in a system. For example, track table 126 may designate a track for an idle task which is executed by CPU core 125 when CPU core 125 is idle an idle track). Thus, the system may keep track of a percentage in which the idle track is used or visited. By comparing this percentage with a preset value or a set of preset values, the system may adjust power consumption of the CPU core 125 and the system. Adjustment methods may include changing clock frequency or adjusting voltages supplied to CPU core 125 and to the system.

Tracker 170 may be configured to provide a read pointer 151 to track table 126. Read pointer 151 may also be in the format of BNX and BNY. The content of the track table entry pointed by the read pointer is read out and examined by exchanger 133, along with BNX and BNY of the entry point (source BNX and source BNY). If the content of the entry has a TBN, the TBN is sent to allocator 1200 to resolve or convert into a BNX and fill the L1 cache memory, then the BN (BNY has the same value of the TBNY) is sent to tracker 170 by exchanger 133. If the content of the entry already has a BN, the BN js sent to tracker 170 by exchanger 133. Tracker 170 may perform several different steps based on the content. For example, if the entry is not a branch point, tracker 170 may update the read pointer as $BNX_{next}BNX_{source}$, and $BNY_{next}=BNY_{source}+1$.

If the entry is a conditional branch, tracker 170 obtains the target BNX and BNY (i.e., the first address and the second address), and sends the target BNX and BNY to allocator 1200 (i.e., active list 121) to fill higher level memory 124 or the L1 cache. Further, tracker 170 may wait for a control signal from CPU core 125 with respect to the branch point. If the control signal indicates the branch is not taken, tracker 170 may update the read pointer as $BNX_{next}=BNX_{source}$, and $BNY_{next}=BNY_{source}+1$. However, if the branch is taken, tracker 170 may update the read pointer as $BNX_{next}=BNX_{target}$, and $BNY_{next}=BNY_{target}$.

If the entry is a un-conditional branch (or jump), tracker 170 may treat this type of instruction as a taken conditional branch, and thus may update the read pointer as $BNX_{next}=BNX_{target}$, and $BNY_{next}=BNY_{target}$.

In addition, if the entry is a 'Call' instruction, tracker 170 may push the current pointer BNX and BNY pair into a stack; read out the content or target BNX, which means the corresponding instruction block is already in L1 cache memory. Further, if the entry is a 'Return' instruction (e.g., the end of a subroutine), tracker 170 may pop the BNX and BNY pair from top of the stack, and may update the read pointer as $BNX_{next}=BNX_{stack}$, and $BNY_{next}=BNY_{stack}$. Under certain circumstances, $BNY_{next}=BNY_{stack}+1$ may be used when the sub-routine call returns to the next instruction of the 'Call' instruction.

Further, if the entry is an exception handling instruction, tracker 170 may read out the block number BNX and offset BNY saved in the Exception BN register (EXCP), and may update the read pointer as $BNX_{next}=BNX_{EXCP}$, and $BNY_{next}=BNY_{EXCP}$. The starting address of an exception handling routing is usually fixed for a particular CPU, and the starting block of the exception handling routine may be filled into the L1 cache and a corresponding track is built in track table (both may be set as not to replaced).

Allocator 1200 may be implemented as a one dimension multi-entry list. Each entry includes a CAM containing upper addresses and a RAM containing BNs and valid, U hit and other flags. Allocator 1200 includes an incrementer (APT) 129 and an adder (+) to point to an entry, while the list may be indexed (addressing) by a TBNX (e.g., FIG. 10A). When a cache fill is requested, the entry pointed by APT 129, its corresponding memory block, and track table entry are filled.

In certain embodiments, allocator 1200 (e.g., reserve list 120, active list 121, etc.) may be configured to provide an address-BNX-TBNX number mapping relationship. For example, the TBNX may be used to index the upper address or the BNX; the upper address may be used to find the BNX or TBNX via upper address matching. When filling the L1 cache, generator 130 computes the branch target address and sends the upper address on bus 141 to CAM part of reserve list 120 for upper address matching. If there is no match, allocator 1200 may take the entry number pointed by pointer 127 as TBNX, and use the TBNX as the track table content. Meanwhile, allocator 1200 may fill the L2 cache block corresponding to the TBNX. On the other hand, if there is a match, allocator 1200 may find the corresponding TBNX, and use TBNX as track table content.

Further, during tracker 170's operation, when track table read pointer 151 points to a track table entry which has a TBN, the TBN is read out from bus 161 and send through bus 180 to index reserve list 120 (i.e., to check if the corresponding instruction block is in the L2 cache). If there is no valid BN, the BNX pointed by APT 129 is put into the entry of the RAM part of this TBN, and the TBN in track table 126 is replaced by the BN. Further, the corresponding instruction block in the L2 cache is filled into the L1 cache in the cache block indexed by the BN. If, however, there is a valid BN, meaning the corresponding instruction block is already in the L1 cache, in that entry, the TBN is replaced by the valid BN. Of course, when track table read pointer 151 points to a table content which has a BN, no checking to allocator 1200 is necessary because the corresponding instruction block is already in the L1 cache.

In addition, allocator 1200 may also support different configurations with respect to active list 121 and reserve list 120 with allocator 1200. For example, allocator 1200 may include two configurations with respect to inclusiveness of entries in active list 121 and reserve list 120.

In one configuration, an exclusive relationship may be generated between active list 121 and reserve list 120, similar to the description related to FIG. 13. To generate the exclusive relationship, reserve list 120 and active list 121 each has its own upper address CAM storage. An address from generator 130 goes to both active list 121 and reserve list 120 for matching to get a either TBNX or BNX. However, there is only one possible match in either active list 121 or reserve list 120, but not in both active list 121 and reserve list 120, which means a particular instruction may exist in either the L1 cache or the L2 cache but not both. Reserve list 120 is indexed by TBNX, its CAM holds upper addresses, and its RAM holds corresponding BNX number, as shown in FIG. 11. An index may select multiple BNX in the same row or entry. Further, active list 121 is indexed by BNX, its CAM holds upper addresses, and its RAM holds TBNX number.

In the other configuration, an inclusive relationship may be generated between active list 121 and reserve list 120. Under such relationship, only reserve list 120 holds upper addresses in its CAM storage, and reserve list 120 may have a structure similar to that shown in FIG. 11. However, active list 121 does not have a CAM part, so an address from generator can be matched only on reserve list 120, which means a particular instruction existing in the L1 cache must exist in the L2 cache. Further, active list 121 is indexed by BNX, and its content is TBNX only. When a L1 cache block is discarded (or replaced by another), the old BNX is sent to active list 121 to find a TBNX to be put in track table 126. For data memory, the L1 cache block may have to be stored back to the cache memory corresponding to reserve list 120.

In certain embodiments, a one-level cache system may be used. Thus, the reserve list entry may be indexed by a TBNX corresponds to a memory block in the main memory, instead of a cache memory, and the upper address of the main memory is in corresponding CAM entry. The RAM part contains a BNX as usual. That is, the TBNX temporary holds a track table entry until the read pointer of track table 126 is close enough to the entry so that the memory block corresponding to the upper address may be filled to the cache (L1). A BNX may then also be assigned to replace the TBNX in track table 126. This BNX may also be kept in the RAM part of the reserve list entry which is indexed by the TBNX.

In addition, allocator 1200 may be configured to facilitate the implementation of replacement policy with respect to the L1 cache. For example, allocator 1200 may support both a least recently used (LRU) policy or a least frequently used (LFU) policy.

Under the LRU policy, allocator 1200 may use a LRU window, formed by main pointer 129 (APT) and the clear pointer (adder +), to find the next memory block to be replaced. The clear pointer moves ahead of main pointer 129 (APT) by a variable amount N, and clears U bit (set to '0') of each entry on the way. On the other hand, the U bit of any entry accessed is set to '1' again. The U bit of the entry pointed by main pointer 129 is checked to determine whether to replace the entry. If the U bit is a '1', it means the entry has been accessed recently and thus not the least recently used, and main pointer 129 increments to check the next entry. If the U bit is a '0', main pointer 129 may stay at the entry for replacement.

Under the LFU policy, allocator 1200 may use the above window arrangement, but to use a count of the number of memory access (indicating a usage frequency) in place of the U bit, the count of the entry pointed by main pointer 129 may be compared to an adjustable value which is set by CPU core 125 or other devices. If the count is less than the adjustable value, main pointer 129 may stay at this entry for replacement.

Exchanger 133 may be configured to facilitate interactions between track table 126 and allocator 1200. For example, within track table 126, when a BN is assigned to replace a TBN (e.g., when an L2 cache block is filled to an L1 cache block), or a TBN is assigned in place of a BN (e.g., when an L1 cache block has to be replaced due to lack of L1 cache space and the replaced block goes back to the L2 cache if not already there), exchanger 133 may replace all references of the old TBNX (BNX) in track table 126 with the new BNX (TBNX) before the old TBNX(BNX) can be reused. Thus, the same BNX will not correspond to two different PC address.

More particularly, exchanger 133 may store a pair of the old TBNX and new BNX and, starting at the point the assign action happens, exchanger 133 moves down to the end of track table 126, goes around to the beginning of track table 126, and till reaching the starting point, replacing any old TBNX by the new BNX, via an extra read port 159 and an extra write port 158. At the same time, exchanger 133 replaces every content read out of the old TBNX with a new BNX before the BN is sent to tracker 170.

In addition, other components may also be configured to provide certain functionalities to support the above disclosed embodiments. For example, CPU core 125 may provide a control signal "TAKEN" to control multiplexer 137 in tracker 170.

CPU core 125 may also provide a control signal "BRANCH/JUMP" to control register 138 in tracker 170. Read pointer 151 moves ahead (e.g., increasing BNY) until the track table content read out is a branch/jump type, and read pointer 151 stops there waiting for CPU core 125 to catch up. In the meantime, the necessity of filling the L1 cache is checked based on the branch target address contains in the content. The BRANCH/JUMP signal indicates to tracker 170 that CPU core 125 has reached the branch instruction and the TAKEN signal is the true will of the program being executed and the correct next address has be selected. Thus, upon detecting this BRANCH/JUMP signal, tracker 170 clocks register 138 to let the new address in register 138 to appear as BN 151. Further, CPU core 125 also provides a partial address "OFFSET" to L1 cache 124 to index instructions within a cache block determined by BNX of BN 151.

L1 memory 124 or higher level memory 124 may be configured into cache blocks or memory blocks indexed by BNX. L1 memory 124 may contain a write port to receive data from bus 140. For the write address, X address (WXADDR), as provided by allocator 170, is from bus 153 generated by APT 129, and Y address (WYADDR, the offset address) is provided by Fetch engine (sync with the data being filled). L1 memory 124 may contain a read port to output data to CPU core 125. For the read address, X address (BNX) is provided from tracker 170 as BN 151, and Y address is provided by CPU core 125 as OFFSET.

Figure 15:
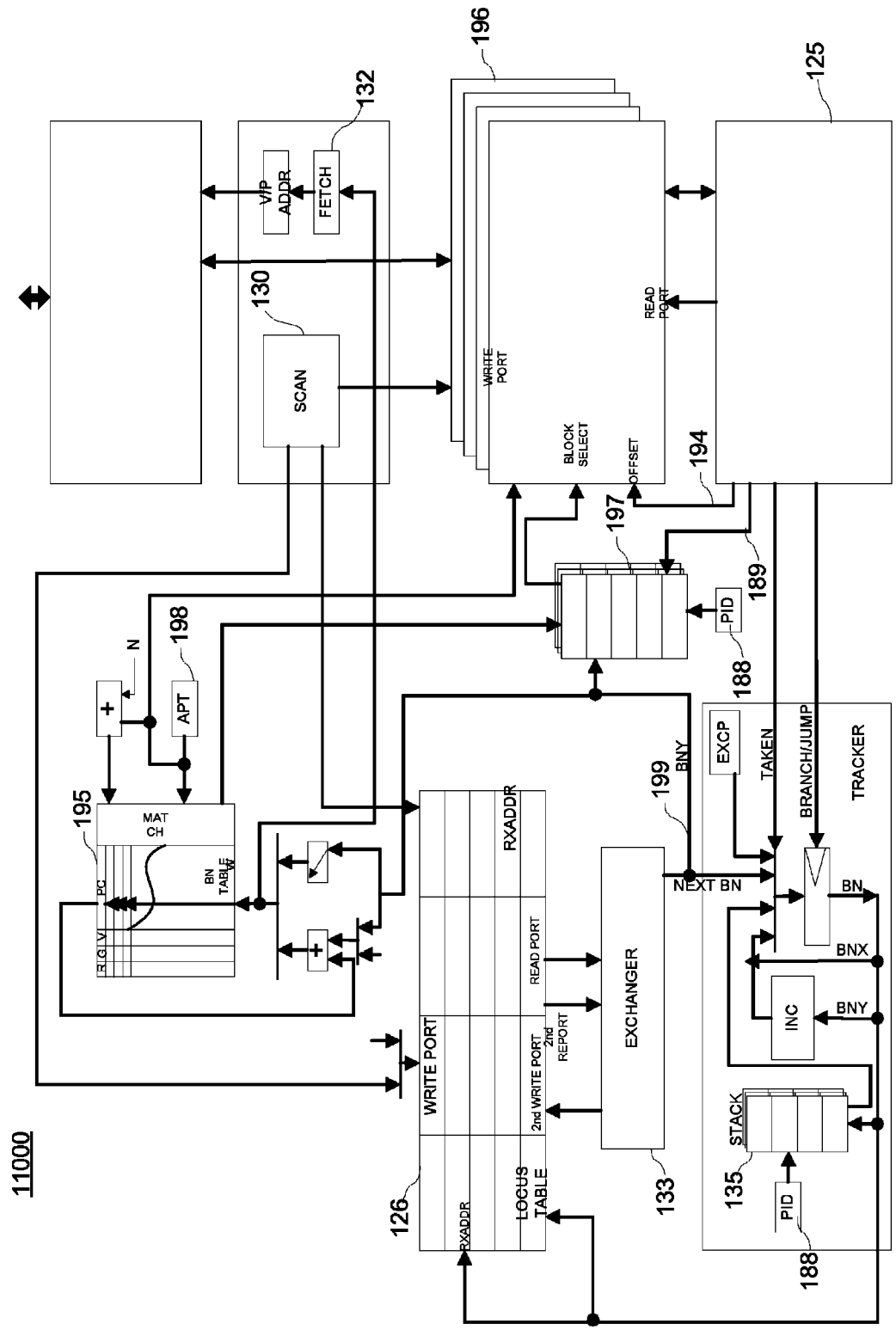
FIG. 15 illustrates another exemplary cache system consistent with the disclosed embodiments.

FIG. 15 shows another exemplary cache system 11000 consistent with the disclosed embodiments. Similar to cache system 9000 described in FIG. 10A, cache system 11000 may be used for caching data instead of instructions. Thus, reserve list 120 and exchanger 133 may be omitted.

Active list 195 for data usage may have the same structure as active list 121. Each entry in active list 195 corresponds to a data block in higher level memory 1196. Further, a base address pointer storage 197 is provided to store block number of data blocks corresponding to base addresses. The number of base address pointers in base address pointer storage 197 is the same as the number of base addresses used by CPU core 125 and can be, for example, 8. Any number may be used. In addition, CPU core 125 may use a base address plus an offset to address higher level memory 196. The offset can ensure the addressed data does not exceed the range of the data block corresponding to the base address.

Multi-thread programming may also be supported. For example, a plurality of stacks 135 may be used for filling instructions in multi-thread programming, as explained previously, and a plurality of base address pointer storages 197 may be used for filling data in multi-thread programming. PID 188 may thus point to a current stack 135 and a current base address pointer storage 197. However, if only one thread is supported, a single stack 135 and a single base address pointer storage 197 may be used and PID 188 may be omitted.

When generator 130 scans and analyzes instructions being fetched, if an instruction changes base address of data, information about the base address, instant number, and register number, etc., are stored in a corresponding track point in track table 126. Further, when CPU core 125 executes the instruction, the base address or a converted base address, may be provided to active list 195 to match contents in active list 195.

If a match is found, the entry number of the matched entry is provided to base address storage 197 as the content for the base address pointer. Because entries in active list 195 correspond to data blocks in higher level memory 196, the base address pointer now has the base address of the corresponding data block in higher level memory 196.

On the other hand, if a match is not found, the base address is provided to fill engine 132 to fill the corresponding data block. When the data block corresponding to the base address is fetched, the base address is stored in an entry of active list 195 pointed by pointer 198, and the fetched data block is stored in a data block in higher level memory 196 pointed by pointer 198. The entry number of the entry in active list 195 is stored in a corresponding base address pointer in base address pointer storage 197. Similar to filling instructions, pointer 198 moves to the next available entry in active list 195.

When CPU core 125 executes an instruction visiting certain data in higher level memory 196, the base address 189 from the instruction is used as an index to read out data block number from base address pointer storage 197. Further, an data load/store address offset 194 is used as an index to find a data entry in the data block pointed by the data block number. The data entry is then used by CPU core 125 for read and write operations.

Figure 16:
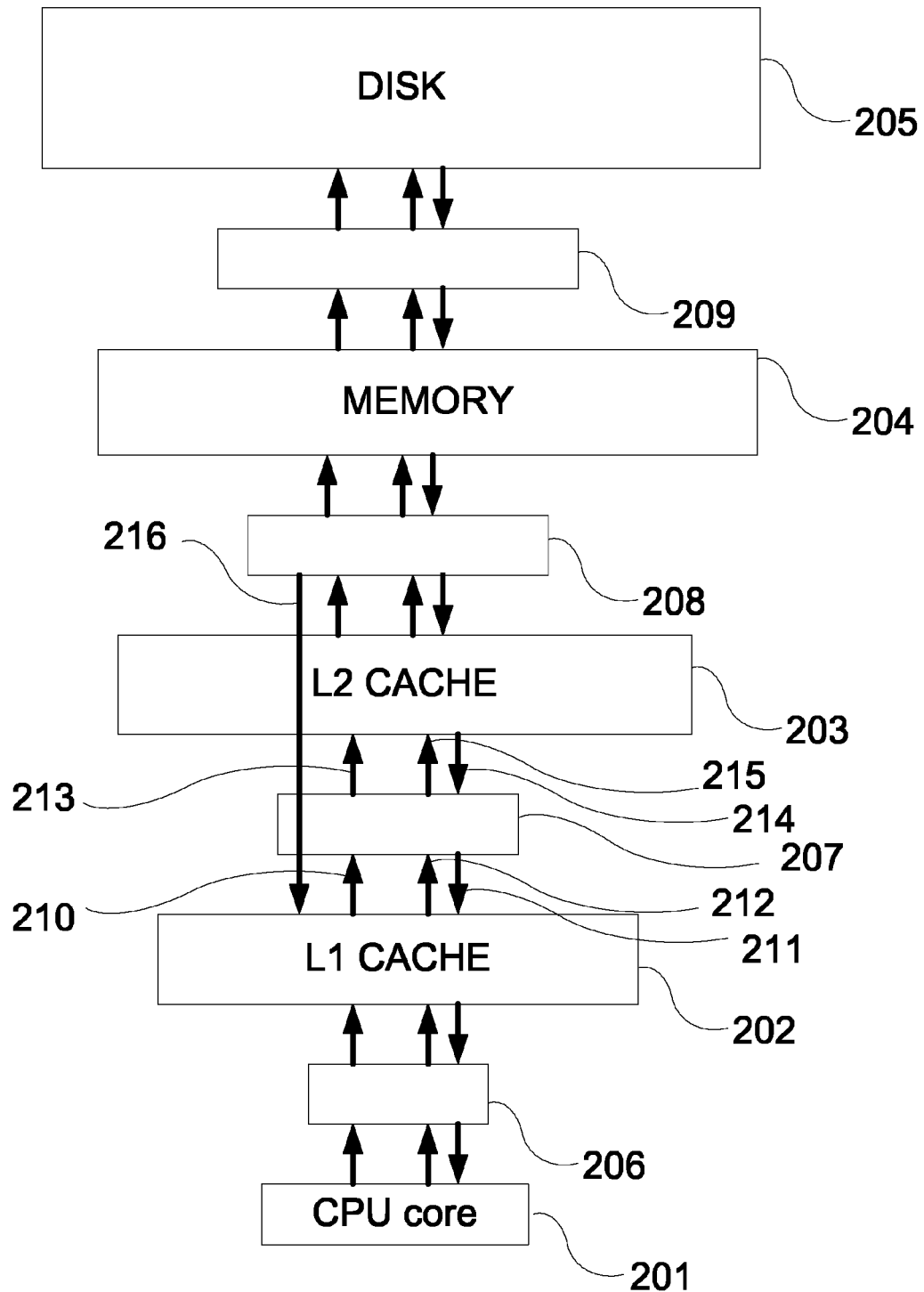
FIG. 16 illustrates an exemplary storage structure using high performance caching structures consistent with the disclosed embodiments.

FIG. 16 is an exemplary storage structure using high performance caching structures consistent with the disclosed embodiments. A caching structure may be similar to a cache control unit as explained previously. As shown in FIG. 16, storage devices used by CPU core 201 include (from high speed to low speed) first level memory 202, second level memory 203, main memory 204, hard disk or mass storage 205. In general, capacity of first level memory 202 is less than second level memory 203; capacity of second memory 203 is less than main memory 204; and capacity of main memory 204 is less than capacity of hard disk 205. Any size or capacity may be used by any storage device.

Further, a caching structure 206 is placed between CPU core 201 and first level memory 202; a caching structure 207 is placed between first level memory 202 and second memory 203; a caching structure 208 is placed between second level memory 203 and main memory 204; and a caching structure 209 is placed between main memory 204 and hard disk 205. Other arrangement may also be used. Such layered caching structures may improve performance of CPU core 201.

For example, with respect to caching structure 207 between first level memory 202 and second memory 203, because CPU core 201 needs to fetch instructions from level one memory 202, and instructions in level one memory 202 comes from level two memory 203. Thus, when instructions passing through caching structure 207, the instructions can be scanned and analyzed to fetch related instructions into level one memory 202 ahead of execution to increase cache hit rate for both instructions and data.

Caching structure 207 may be similar to caching structure 206, the interface of caching structure 207 to level one memory includes address bus 210, read data bus 212, and write data bus 211, and interface to level two memory 203 includes address bus 213, read data bus 214, and write data bus 215. Caching structure 207 may thus increase a hit rate of level one memory 202.

Similarly, caching structure 208 between level two memory 203 and main memory 204 may increase a hit rate of level two memory 203, and caching structure 209 between main memory 204 and hard disk 205 may increase a hit rate of main memory 204. If hard disk 205 includes all instructions required by CPU core 201, through this layered caching structures, a high hit rate or high performance may be maintained by CPU core 201.

Further, caching structures between slower memories may have wider bandwidth, i.e., the number of instructions or data fetched at one time. For example, the bandwidth of caching, structure 209 is larger than the bandwidth of caching structure 208; the bandwidth of caching structure 208 is larger than the bandwidth of caching structure 207; and the bandwidth of caching structure 207 is larger than the bandwidth of caching structure 206. Other configurations may also be used.

In addition, a separate path 216 may be provided between caching structure 208 and level one memory 202. Instructions or data may be filled from main memory 204 into level two memory 203 and level one memory 202 at the same time to further increase the performance of the entire system.

INDUSTRIAL APPLICABILITY

The disclosed systems and methods may be used in various applications in memory devices, processors, processor subsystems, and other computing systems. For example, the disclosed systems and methods may be used to provide low cache-miss rate processor applications, and high-efficient data processing applications crossing multiple levels of caches or even crossing multiple levels of networked computing systems.

The invention claimed is:

1. A digital system, comprising:
a processor core capable of being coupled to a first memory containing executable instructions and a second memory with a faster speed than the first memory, and configured to execute one or more instructions of the executable instructions from the second memory; and
a cache control unit configured to be coupled to the first memory, the second memory, and the processor core to fill at least the one or more instructions from the first memory to the second memory before the processor core executes the one or more instructions, wherein the cache control unit is further configured to:
examine instructions being filled from the first memory to the second memory to extract instruction information containing at least branch information;
determine a plurality of branch instructions based on the extracted instruction information;
determine a next instruction and a target instruction of each of the plurality of branch instructions; and
fill the next instruction and the target instruction of each of the plurality of branch instructions, if any of which was not already filled.

2. The digital system according to claim 1, wherein the instructions are part of program code to be executed by the processor core and the cache control unit is further configured to:
determine and store program flow information of the instructions using the extracted instruction information, wherein the program flow information contains position information of the next instruction and the target instruction of each of the plurality of branch instructions such that the next instruction and the target instruction of each of the plurality of branch instructions can be directly determined in a sequence of the program flow.

3. The digital system according to claim 2, wherein the program flow includes a to-be-executed branch instruction from the plurality of branch instructions and the cache control unit is further configured to:
fill the next instruction and the target instruction of the to-be-executed branch instruction before the processor core executes the to-be-executed branch instruction from the second memory such that both the next instruction and the target instruction of the to-be-executed branch instruction can be fetched by the processor core from the second memory.

4. The digital system according to claim 2, wherein:
the instruction information further includes an instruction type as one of a branch instruction and a non-branch instruction.

5. The digital system according to claim 4, wherein:
the branch instruction includes a conditional branch instruction and a non-conditional branch instruction;
the program flow goes to a next instruction of a non-branch instruction;
the program flow goes to a target instruction of a non-conditional branch instruction; and
the program flow goes to either a next instruction or a target instruction of a conditional branch instruction.

6. The digital system according to claim 2, wherein:
the branch information further includes a branch source address and a branch target address in a format different from a program counter (PC) address used by the processor core.

7. The digital system according to claim 1, wherein the cache control unit is further configured to:
- determine the next instruction and the target instruction of the to-be-executed branch instruction before the processor core executes the to-be-executed branch instruction;
- fill the next instruction and the target instruction of the to-be-executed branch instruction in the second memory; and
- wait for the processor core to execute the to-be-executed branch instruction.

8. The digital system according to claim 7, wherein the cache control unit is further configured to:
- receive a branch-taken signal from the processor core after the processor core executes the to-be-executed branch instruction; and
- determine whether a branch instruction is taken by the processor core based on the received branch-taken signal.

9. The digital system according to claim 8, wherein the cache control unit is further configured to:
- when the branch instruction is taken by the processor core, discard the next instruction; and
- process a next to-be-executed branch instruction after the target instruction.

10. The digital system according to claim 9, wherein the cache control unit is further configured to:
- when the branch instruction is not taken by the processor core, discard the target instruction; and
- process a next to-be-executed branch instruction after the next instruction.

11. The digital system according to claim 10, wherein the cache control unit is further configured to:
- provide a block address to the processor core to form a memory address by combining an address provided by the processor core to access the second memory when fetching either the instruction or the target instruction for execution.

12. A cache control method for a digital system containing a processor core capable of being coupled to a first memory containing executable instructions and a second memory with a faster speed than the first memory and configured to execute one or more instructions of the executable instructions from the second memory, and a cache control unit configured to be coupled to the first memory, the second memory, and the processor core to fill at least the one or more instructions from the first memory to the second memory before the processor core executes the one or more instructions, the method comprising:
- examining instructions being filled from the first memory to the second memory to extract instruction information containing at least branch information;
- determining a plurality of branch instructions based on the extracted instruction information;
- determining a next instruction and a target instruction of each of the plurality of branch instructions; and
- filling the next instruction and the target instruction of each of the plurality of branch instructions, if any of which was not already filled.

13. The method according to claim 12, wherein the instructions are part of program code to be executed by the processor core and the method further includes:
- determining and storing program flow information of the instructions using the extracted instruction information, wherein the program flow information contains position information of the next instruction and the target instruction of each of the plurality of branch instructions such that the next instruction and the target instruction of each of the plurality of branch instructions can be directly determined in a sequence of the program flow.

14. The method according to claim 13, wherein the program flow includes a to-be-executed branch instruction from the plurality of branch instructions and the method further includes:
- filling the next instruction and the target instruction of the to-be-executed branch instruction before the processor core executes the to-be-executed branch instruction from the second memory such that both the next instruction and the target instruction of the to-be-executed branch instruction can be fetched by the processor core from the second memory.

15. The method according to claim 13, wherein:
the instruction information further includes an instruction type as one of a branch instruction and a non-branch instruction.

16. The method according to claim 15, wherein:
the branch instruction includes a conditional branch instruction and a non-conditional branch instruction;
the program flow goes to a next instruction of a non-branch instruction;
the program flow goes to a target instruction of a non-conditional branch instruction; and
the program flow goes to either a next instruction or a target instruction of a conditional branch instruction.

17. The method according to claim 13, wherein:
the branch information further includes a branch source address and a branch target address in an address format different from a program counter (PC) address used by the processor core.

18. The method according to claim 12, further including:
determining the next instruction and the target instruction of the to-be-executed branch instruction before the processor core executes the to-be-executed branch instruction;
filling the next instruction and the target instruction of the to-be-executed branch instruction in the second memory; and
waiting for the processor core to execute the to-be-executed branch instruction.

19. The method according to claim 18, further including:
receiving a branch-taken signal from the processor core after the processor core executes the to-be-executed branch instruction; and
determining whether a branch instruction is taken by the processor core based on the received branch-taken signal.

20. The method according to claim 19, further including:
when the branch instruction is taken by the processor core, discarding the next instruction; and
processing a next to-be-executed branch instruction after the target instruction.

21. The method according to claim 20, further including:
when the branch instruction is not taken by the processor core, discarding the target instruction; and
processing a next to-be-executed branch instruction after the next instruction.

22. The method according to claim 21, further including:
providing a block address to the processor core to form a memory address by combining an address provided by the processor core to access the second memory when fetching either the instruction or the target instruction for execution.

* * * * *